(12) United States Patent
Aschwanden et al.

(10) Patent No.: US 12,253,744 B2
(45) Date of Patent: Mar. 18, 2025

(54) OPTICAL DEVICE, PARTICULARLY FOR TUNING THE FOCAL LENGTH OF A LENS OF THE DEVICE BY MEANS OF OPTICAL FEEDBACK

(71) Applicant: Optotune AG, Dietikon (CH)

(72) Inventors: Manuel Aschwanden, Allenwinden (CH); David Niederer, Kuttigen (CH); Roman Patscheider, Winterthur (CH); Daniel Borer, Schlieren (CH); Christopher Laning, Windisch (CH); Michael Bueeler, Vogelsang (CH)

( * ) Notice: Subject to any disclaimer, the term of this patent is extended or adjusted under 35 U.S.C. 154(b) by 157 days.

(21) Appl. No.: 16/900,927

(22) Filed: Jun. 14, 2020

(65) Prior Publication Data

US 2020/0379275 A1     Dec. 3, 2020

Related U.S. Application Data

(62) Division of application No. 15/316,159, filed as application No. PCT/EP2015/062462 on Jun. 3, 2015, now Pat. No. 10,684,495.

(30) Foreign Application Priority Data

Jun. 3, 2014    (EP) .................................... 14170996

(51) Int. Cl.
G02C 7/00      (2006.01)
G02B 3/14      (2006.01)
(Continued)

(52) U.S. Cl.
CPC ............... G02C 7/085 (2013.01); G02B 3/14 (2013.01); G02B 7/32 (2013.01); G02B 26/004 (2013.01);
(Continued)

(58) Field of Classification Search
CPC ........ G02C 7/085; G02C 7/041; G02C 7/081; G02C 7/04; G02C 7/042; G02C 7/049;
(Continued)

(56) References Cited

U.S. PATENT DOCUMENTS 3,573,641 A    4/1971   Zenk
4,642,439 A    2/1987   Miller
(Continued)

FOREIGN PATENT DOCUMENTS

CH    541815      9/1973
CN    1650218     8/2005
(Continued)

Primary Examiner — Henry Duong
(74) Attorney, Agent, or Firm — JMB Davis Ben-David

(57) ABSTRACT

The invention relates to an optical device, comprising: a lens having an adjustable focal length. According to the invention, a light source which is configured to emit light that is affected by said lens and impinges on at least a first photosensitive element, which is designed to generate a first output signal corresponding to the intensity of light impinging on it, wherein the first photosensitive element is configured to measure only a portion of the intensity distribution of said emitted light, and wherein the light source, the lens and the first photosensitive element are configured such that a change of the focal length of said lens changes the intensity distribution of the emitted light that impinges on the first photosensitive element, so that each focal length of the lens is associated to a specific first output signal generated by the first photosensitive element.

4 Claims, 16 Drawing Sheets

(51) Int. Cl.
  *G02B 7/32*  (2021.01)
  *G02B 26/00* (2006.01)
  *G02C 7/04*  (2006.01)
  *G02C 7/08*  (2006.01)
  *G02B 27/40* (2006.01)

(52) U.S. Cl.
  CPC .............. *G02C 7/041* (2013.01); *G02B 27/40* (2013.01); *G02C 7/081* (2013.01)

(58) Field of Classification Search
  CPC .......... G02C 7/083; G02C 7/10; G02C 7/101; G02C 2202/12; G02C 2202/14; G02B 3/14; G02B 7/32; G02B 26/004; G02B 27/40
  USPC ..................................................... 359/159.03
  See application file for complete search history.

(56) References Cited

U.S. PATENT DOCUMENTS

| | | | | |
|---|---|---|---|---|
| 5,371,629 | A * | 12/1994 | Kurtin | G02B 3/14 351/158 |
| 8,282,212 | B2 * | 10/2012 | Hillis | G02C 7/083 351/205 |
| 8,488,250 | B2 * | 7/2013 | Nibauer | G02C 7/085 359/666 |
| 2008/0062384 | A1 | 3/2008 | Rombach | |
| 2008/0218696 | A1 | 9/2008 | Mir | |
| 2010/0108765 | A1 | 5/2010 | Vinogradov | |
| 2012/0092612 | A1 | 4/2012 | Binder | |
| 2012/0140167 | A1 * | 6/2012 | Blum | G02C 7/04 351/159.73 |
| 2012/0194781 | A1 | 8/2012 | Agurok | |
| 2012/0310339 | A1 | 12/2012 | Berge | |
| 2013/0208347 | A1 | 8/2013 | Haddock | |
| 2014/0002789 | A1 | 1/2014 | Pugh | |
| 2014/0327875 | A1 * | 11/2014 | Blum | G02C 7/083 623/6.22 |
| 2015/0301338 | A1 * | 10/2015 | Van Heugten | G09G 3/32 345/8 |

FOREIGN PATENT DOCUMENTS

| | | |
|---|---|---|
| CN | 1675575 | 9/2005 |
| CN | 1823293 | 8/2006 |
| CN | 1909860 | 2/2007 |
| CN | 101052897 | 10/2007 |
| CN | 101646400 | 2/2010 |
| CN | 101877048 | 11/2010 |
| CN | 102271899 | 12/2011 |
| CN | 102411220 | 4/2012 |
| CN | 102804032 | 11/2012 |
| CN | 103365027 | 10/2013 |
| CN | 103596522 | 2/2014 |
| CN | 103684586 | 3/2014 |
| DE | 102012104579 | 12/2013 |
| EP | 1291705 | 3/2003 |
| EP | 2495593 | 9/2012 |
| JP | 2006072267 | 3/2006 |
| JP | 2006330321 | 12/2006 |
| JP | 2010043954 | 2/2010 |
| JP | 2011248211 | 12/2011 |
| WO | 2009/021344 | 2/2009 |
| WO | 2010/104904 | 9/2010 |
| WO | 2011052770 | 5/2011 |

* cited by examiner

Reflectance (%) vs. Wavelength (nm)

Transmittance (%) vs. Wavelength (nm)

OPTICAL DEVICE, PARTICULARLY FOR TUNING THE FOCAL LENGTH OF A LENS OF THE DEVICE BY MEANS OF OPTICAL FEEDBACK

CROSS-REFERENCE TO RELATED APPLICATIONS

This is a Divisional of U.S. patent application Ser. No. 15/316,159, filed Dec. 19, 2016, which is the U.S. National Stage of International Application No. PCT/EP2015/062462, filed Jun. 3, 2015, which in turn claims the benefit of European Patent Application No. 14170996.4, filed Jun. 3, 2014. The contents of the forgoing patent applications are incorporated by reference herein in their entirety.

TECHNICAL FIELD

The present invention relates to an optical device, a method as well as to a contact lens and an optical device, particularly glasses (also denoted as spectacles).

BACKGROUND

Exemplary lenses are described in U.S. 61/160,041, WO2010/104904 or WO2009/021344A1. Such an optical devices comprises a lens that has an adjustable focal length so that the lens can assume a plurality of different focal lengths, e.g. due to a deformable surface or membrane of the lens so that the surface or membrane can assume a plurality of different curvatures, wherein each such curvature corresponds to a different focal length of the lens or due to the fact that the adjustable focus lens is a lens that is designed such that the refractive index of the lens can be adjusted (e.g. locally). These lenses are also denoted as focus tuneable lenses. Further, the optical device may comprises an (e.g. actuation) means or mechanism that is designed to adjust the focal length of the lens (e.g. to deform said surface/membrane of the lens so that the surface/membrane assumes one of said curvatures, or to locally change the refractive index). Since the shape/curvature of the surface of the lens and the refractive index of the lens can be affected by a varying temperature of the lens itself, or the environment of the lens, the focal length of the lens is subject to variations. It is therefore desirable to be in principle able to determine the actual focal length of the focus tuneable lens in a simple and robust manner. Furthermore, in particular, it is desirable to be also able to control the focal length in a simple and robust way.

The afore-mentioned problem is solved by an optical device having the features the claims. Preferred embodiments of the present invention are stated in the sub claims or are explained below.

SUMMARY

The optical device further comprises at least one light source (e.g. a light emitting diode (LED) or a laser) which is configured to emit light that is affected (e.g. modulated or deflected) by said lens and impinges on at least a first photosensitive element (e.g. a photo diode or a similar device such as photosensitive thermoelectrical generator, a position sensitive device (PSD), a photodiode array (PDA), a quadrant diode (QPD), or a charge coupled device (CCD)), wherein the first photosensitive element is designed to generate an output signal corresponding to the intensity of light impinging on it, wherein particularly the first photosensitive element is configured to measure only a portion of the intensity distribution of said emitted light, i.e. only a portion of said distribution (i.e. a part of said light) actually hits the at least one first photosensitive element, wherein the optical device (e.g. the light source, the lens and the at least one first photosensitive element as well as eventually other optical elements, see below) is configured such that a change of the focal length of said lens changes the intensity distribution of the emitted light that impinges on the first photosensitive element, so that each focal length of the lens corresponds to a specific (i.e. unique) first output signal generated by (or with help of) the first photosensitive element.

This principle of the present invention allows one to make the optical device/system according to the invention more compact than with for example the astigmatic lens approach where all signal is collected by the photodiodes.

Additionally, the present invention corresponds to a very tolerance insensitive measurement method, as the (at least one) first photosensitive element (e.g. a photo diode) does not need to be placed in the center of the (e.g. Gauss like) intensity distribution of said emitted light (the emitted light can be regarded as a light beam having said intensity distribution, i.e., a peak or maximum in the center and an outwardly decreasing intensity). Advantageously, the optical device according to the present invention is particularly designed such that a change in the focal length is changing the width (e.g. full width half maximum) of said intensity distribution of the light impinging on the (at least one) first photosensitive element. Furthermore, the optical device according to the present invention is particularly designed such that a change in focal length is moving the center (e.g. peak or maximum) of the intensity distribution of said emitted light and therefore the intensity distribution of the light impinging on the (at least one) first photosensitive element. In other words, a change in focal length changes the intensity of the light collected at a given point or area by means of the first photosensitive element.

The foregoing and other objects, features, and advantages will become more apparent from the following detailed description, which proceeds with reference to the accompanying figures.

DETAILED DESCRIPTION

Figure 1:
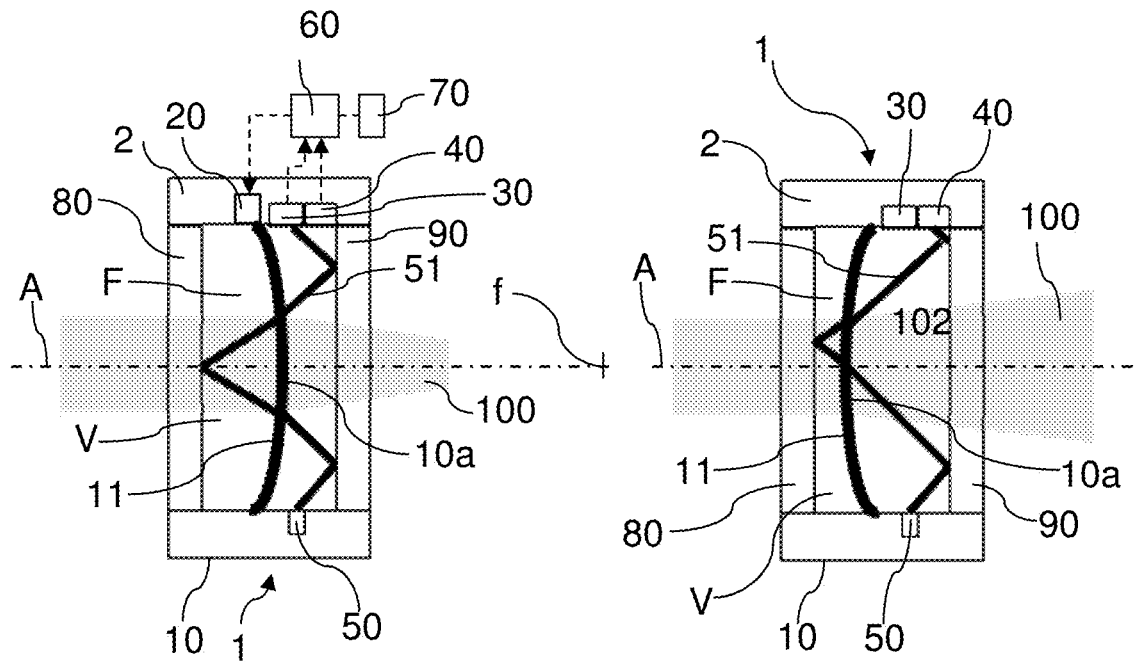
FIG. 1 Schematically depicts an embodiment of an optical device and method according to the invention.

According to an embodiment of the present invention the optical device comprises a second photosensitive element (or even more than two such elements), wherein the light source is configured to emit light that is affected (e.g. modulated or deflected) by said lens and impinges on the first photosensitive element and/or the second photosensitive element, wherein the second photosensitive element is designed to generate a second output signal corresponding to the intensity of the light impinging on the second photosensitive element, wherein the light source, the lens and said photosensitive elements are configured such that a change of the focal length of said lens changes the intensity distribution of the emitted light that impinges on the first photosensitive element and/or the second photosensitive element, so that each focal length of the lens is associated to a specific first output signal generated by the first photosensitive element and to a specific second output signal generated by the further second photosensitive element.

According to a preferred embodiment of the present invention, the lens of the optical device comprises a first focal length and a different second focal length (e.g. a minimal and a maximal focal length), wherein, when the lens is adjusted such that it comprises said first focal length, the peak of the intensity distribution hits the first photosensitive element, and wherein, when the lens is adjusted such that it comprises the second focal length, said peak hits the second photosensitive element.

In other words, since merely parts of the intensity distribution, i.e. merely parts of the cross section of the light beam originating from said light source, are measured/detected by the photosensitive elements, the output signals can be enhanced by designing the optics such that the peak of the intensity distribution of the reflected light is once hitting the first photosensitive element and at an e.g. another extreme tuning state the second photosensitive element.

According to a preferred embodiment of the present invention, the optical device is configured such that a change in the focal length of said lens changes the width of the intensity distribution of said emitted light that impinges on the first photosensitive element and/or the second photosensitive element. Alternatively or in addition, according to a further preferred embodiment of the present invention, the optical device is configured such that a change in the focal length of said lens changes/displaces the position of the maximum (peak) of the intensity distribution of said emitted light that impinges on the first photosensitive element and/or the second photosensitive element with respect to the first and/or second photosensitive element (see also above). Due to the fact that when the focal length of the lens is changed (e.g. by changing the curvature of the lens and/or its refractive index), the light of the light source is deflected/modulated differently by the lens and thus impinges differently on the photosensitive elements. Therefore, said output signals actually allow for determining the current focal length of the lens in principle. A calibration can be easily performed by using a further method for determining the focal length of the lens and by measuring said first and/or second output signal for the respective focal length which establishes a correspondence between the focal lengths and the respective first and/or second output signal. The output signals may be electrical currents which can be quantified using their respective strength of current.

In case several photosensitive elements (e.g. two such elements) are present, the optical device is preferably adapted to generate a further output signal X from the individual (e.g. first and second) output signals O1, O2, e.g. X=(O1−O2)/(O1+O2), wherein the focal length is preferably calibrated versus X. However a calibration versus O1 and O2 may also be conducted. In case only one (i.e. the first) photosensitive element is present, the focal length is calibrated versus O1. When controlling the focal length, O1 (for a single first photosensitive element) is made to approach a reference value that corresponds to the individual focal length that is to be adjusted, whereas in the case of two photosensitive elements a further output signal (e.g. current) X (see above) is preferably automatically determined and made to approach a reference value that corresponds to the individual focal length that is to be adjusted.

According to an embodiment of the present invention, for controlling the focal length, the optical device may comprise a means or mechanism (e.g. an actuation means) for changing the focal length of the lens.

Further, according to a preferred embodiment of the optical device according to the invention, for controlling adjustment of the focal length of the lens to a predetermined focal length, the optical device comprises a control unit being adapted to control said (actuation) means such that the latter changes the focal length of the lens (e.g. deforms said surface/membrane of the lens or changes a refractive index of the lens in a way) so that the first and/or second output signal or a further output signal generated from the first and second output signal approaches a reference output signal, wherein said reference output signal correspond to said predetermined focal length (calibration).

According to a preferred embodiment of the optical device according to the invention, the optical device comprises a memory in which a plurality of focal lengths is stored as well as a reference output signal for each focal length. Thus, the memory contains a look-up table for looking up the reference output signal (e.g. a reference value for said further output signal or for the first and/or second output signal). For instance, in case the focal length shall be (automatically) adjusted to a certain focal length required by a user or an application, the reference output signal corresponding to said desired focal length is fetched from said table and the focal length (or curvature) of the lens is adjusted such by said (actuation) means that the current output signal (or first and/or second output signal) approaches the respective reference value. This is denoted as optical feedback in the framework of the present invention.

According to a preferred embodiment of the present invention, said optical device is a focus tunable lens device which can be used for changing the focus spot of a laser processing device, e.g. a laser marking device, wherein a processing laser is modulated by the device according to the invention before it is hitting a scanning mirror and a sample that has to be processed. Further, the optical device according to the invention can be a laser processing device or a laser marking device.

According to another preferred embodiment of the present invention, the optical device is part of a microscope (e.g. part of the objective or an ocular of the microscope) or forms such a microscope.

According to another preferred embodiment of the present invention, the optical device is part of a camera (e.g. part of the lens objective) or forms such a camera.

According to a preferred embodiment of the optical device according to the invention, the optical device further comprises a first optical element configured to reflect said light emitted by the light source before it impinges on the first and/or second photosensitive element. Further, this first optical element is preferably configured such that a main optical signal is transmitted by the first optical element, essentially without affecting said optical feedback (see also below).

According to a preferred embodiment of the optical device according to the invention, the optical element is a first cover element of the lens (e.g. out of a glass or plastic, or a polished metal surface when not arranged in the optical path of the main signal), wherein said first cover element and an elastically deformable membrane forming said surface of the lens delimit a volume (or container) of the lens being filled with a fluid. Here, said membrane of the lens is a thin element that is transparent (at least to the main optical signal) and elastically expandable and extends (essentially two-dimensionally) along an extension plane (the thickness of the membrane normal to its extension plane/surface is significantly smaller than the dimension of the membrane along said extension plane). The membrane can be made of at least one of the following materials: a glass, a polymer, an elastomer, a plastic or any other transparent and stretchable or flexible material. For example, the membrane may be made out of a silicone-based polymer such as poly(dimethylsiloxane) also known as PDMS or a polyester material such as PET or a biaxially-oriented polyethylene terephtalate (e.g. "Mylar"). Further, said fluid preferably is or comprises a liquid metal, a gel, a liquid, a gas, or any transparent, absorbing or reflecting material which can be deformed. For example, the fluid may be a silicone oil (e.g. Bis-Phenylpropyl Dimethicone). Additionally the fluid may include fluorinated polymers such as perfluorinated polyether (PFPE) inert fluid.

According to an embodiment of the optical device according to the invention, the curvature of the lens (e.g. curvature of said surface/membrane) is proportional to the pressure in the fluid. In order to adjust said pressure and therewith the curvature/focal length of the lens said actuation means is designed to exert a corresponding pressure on the volume (container) of the lens. For instance, the actuation means may be an electromagnetic actuator (e.g. a voice coil motor) that comprises a coil interacting with a magnet, which coil is used to exert pressure on the said volume of the lens.

Hence, the focal length of the lens is controlled by the current flowing through the coil of the actuator. The actuation means can also be formed by a stepper motor or an electrostatic actuator such as a piezo motor or an electroactive polymer actuator. The actuation means can also be designed as a reluctance actuator which exerts a reluctance force on the volume in order to change the curvature of the surface or membrane of the lens. Further, the actuation means can consist of one or multiple actuators. It is also conceivable that the actuation means is actually manually actuated (e.g. by means of a rotation that is translated into a deformation of the surface of the lens by the actuation means).

Further, according to a preferred embodiment of the optical device according to the invention, the optical device comprises a second optical element that is configured to reflect said light emitted by the light source before it impinges on the first and/or second photosensitive element (again, the second optical element is preferably configured such that said main optical signal is transmitted by the second optical element, particularly essentially without affecting the optical feedback, see also below).

According to a preferred embodiment of the optical device according to the invention, said second optical element can be a (second) cover element of the lens, too, wherein said surface or membrane of the lens is then arranged between the first and the second cover element. Preferably, said cover elements are oriented parallel with respect to each other. The second optical element can be made out of the same materials as the first optical element/cover element (see also above).

According to a preferred alternative embodiment of the optical device according to the invention, the second optical element is a partially reflective mirror that is inclined with respect to the first optical element or said lens, and is designed to reflect said light emitted by the light source towards the first and/or second photosensitive element and to transmit the main optical signal. Here, also a second cover element of the lens may be present, which second cover element is then however not configured to directly or indirectly reflect the light from the light source towards the photosensitive elements.

Further, according to an embodiment of the present invention, the optical device comprises a further light source, wherein the further light source is configured to emit light that is affected by said lens and impinges on the first photosensitive element and/or the second photosensitive element, such that each light path from said light source to one of the photosensitive elements is substantially symmetric, particularly symmetric, to a corresponding light path from the further light source to one of the photosensitive elements. Particularly, this allows the normalization of all photosensitive elements and light source efficiencies/sensitivities. For instance, in case one light source (e.g. LED) is turned on and two photosensitive elements are present, a relative signal between the two photosensitive elements (e.g. photo diodes) can be used to measure the deflection of the lens (independent of the LEDs absolute intensity). The same is true if only one photosensitive element but two light sources (e.g. LEDs) are used.

Further, according to an embodiment of the present invention, the optical device comprises at least one optical filter configured to prevent light of the first and/or second light source from exiting or re-entering the optical device and/or lens.

Further, according to an embodiment of the present invention, a consistent (e.g. linear or monotonic) feedback signal may be achieved by mechanically referencing the light source (e.g. LED) directly to an mechanical component (e.g. the lens or housing) of the optical device and connecting it through a flex cable, a wire bonding connection or molded interconnect devices to an energy source such as a current source and/or by actively aligning the light source/LED during assembly.

Further, according to an embodiment of the present invention, the optical device, particularly the lens, is configured to affect said emitted light by means of light scattering and/or refraction and/or total internal reflection, wherein particularly the optical device, particularly the lens, comprises at least one diffractive element for generating said light scattering, wherein particularly said at least one diffractive element is arranged on the membrane or comprised by the membrane of the lens of the optical device.

Further, according to an embodiment of the present invention, the optical device comprises at least one temperature sensor being in thermal contact with the first and/or second photosensitive element (30, 40) (for this the sensor may be arranged in close proximity to the photosensitive elements), wherein particularly the optical device is configured to use said at least one temperature sensor for compensating a temperature-dependent sensitivity of the first and/or second photosensitive element.

Particularly, in an embodiment, the optical device is configured to compensate a temperature dependency of the first and/or second output signal (e.g. caused by a thermally induced change in the refractive index and/or a thermal expansion of one or several materials of the lens) by means of measuring the lens temperature using said at least one temperature sensor and assuming a fixed offset of the first and/or second output signal with temperature, Further, particularly, in an embodiment, the optical device is configured to compensate a temperature dependency of the first and/or second output signal (e.g. caused by a thermally induced change in the refractive index and/or a thermal expansion of one or several materials of the lens) by characterizing the lens at more than one reference temperature, storing said characterization in a memory, and using said at least one temperature sensor within the lens as a reference.

Further, particularly, in an embodiment, the optical device further comprises a heating means that is configured to stabilize the temperature of the lens in order to reduce temperature-induced changes of optical properties of the lens such as its focal length, wherein particularly the temperature is stabilized at the same temperature for which it has been characterized or designed.

Further, regarding sensing of the temperature of the lens, an aspect of the present invention relates to controlling the temperature of the lens of an optical device according to the invention by driving the lens in a constant power regime to stabilize its temperature at the same temperature for which it has been characterized or designed.

According to a preferred embodiment of the optical device according to the invention, the lens is further designed to focus or diverge a main optical signal transmitted through the lens along an optical axis of the lens, wherein the light source, said photosensitive elements and particularly said first and/or second optical element are arranged such with respect to the lens that said main optical signal does not affect said first and/or second output signal (or said further output signal), i.e., is not coupled into the optical path of said light from said light source).

Further, according to a preferred embodiment of the optical device according to the invention, the optical device is designed to measure a background noise generated by the first and/or by the second photosensitive element, when the light source is turned off, and to subtract said background noise measured by the first photosensitive element from the first output signal and/or said background noise measured by the second photosensitive element from the second output signal.

Alternatively or in addition, for reducing (such) external noise in the first and/or second output signal (or in the further output signal), the optical device is configured such that the light source emits modulated light (the optical device may comprise a modulator interacting with the light source such that the light emitted from the light source is modulated, wherein the modulation frequency is larger than the frequencies of the fluctuations/adjustments of the shape/curvature of the surface or membrane of the lens. In order to remove said unwanted noise, the device is preferably adapted to demodulate the output signal(s) and to band-pass filter or low-pass filter the output signal(s) which finally removes said noise.

Further, according to an embodiment of the present invention, the optical device is a contact lens that is configured to be placed directly on the surface of an eye of a user or an optical device to be worn in front of an eye (e.g. a pair of glasses or a single eye glass or a virtual display) or an intraocular lens.

Further, according to an embodiment of the present invention, said optical device comprises at least one light source, at least one photosensitive element and a membrane lens (a lens comprising a deformable membrane and a fluid), a liquid crystal, an electro-wetting based or another focus adjustable lens.

Further, according to an embodiment of the present invention, the light source, the lens and the first photosensitive element are further configured such that emitted light is reflected by the lens of the eye of the user before impinging on the first photosensitive element, so that the intensity distribution of the emitted light that impinges on the first photosensitive element changes when said user deforms the lens of his eye (e.g. when focusing) or changes the position of the eye with respect to the glasses or the contact lens on the surface of the eye (e.g. in a radial direction) which may be conducted by the user by looking at an object (e.g. his hand) close by or by looking down.

Further, the problem underlying the present invention is solved by a method for adjusting the focal length of a lens, particularly using an optical device according to the invention, particularly a contact lens, an optical device to be worn in front of an eye of a user (e.g. glasses) or even an intraocular lens.

The method according to the invention comprises the steps of: emitting light by means of a light source (e.g. an LED or laser) such that said light is affected (e.g. deflected or modulated) by said lens (e.g. by a surface/membrane of said lens) and merely a part of said light (i.e. a portion of the intensity distribution of said light) impinges on at least a first photosensitive element, which part (or portion) depends on the focal length of the lens (see also above) or on the form of the lens of the eye of the user wearing the optical device (e.g. a contact lens or glasses) or on the position of the contact lens on a surface of the eye of the user or on the position of the eye with respect to the optical device/glasses, wherein the first photosensitive element generates a first output signal when said part of said light impinges on the first photosensitive element, wherein said first output signal corresponds to the intensity of said part of the light impinging on the first photosensitive element, and preferably automatically adjusting the focal length to a desired or predetermined focal length using the first output signal as a control signal (e.g. for triggering an actuator that adjusts the focal length to the desired focal length) such that said first output signal (or a further output signal determined with help of the first output signal) approaches a reference output signal that is associated to said predetermined focal length.

Preferably, at least a further (second) photosensitive element is used, and the following steps are then performed: emitting light by means of a light source such that said light is affected (e.g. deflected or modulated) by the lens (e.g. by a surface/membrane of said lens) and impinges on a first and/or a second photosensitive element, wherein the first photosensitive element generates a first output signal when (merely) a part of the light impinges on the first photosensitive element, wherein said first output signal corresponds to the intensity of the part of light impinging on the first photosensitive element, and wherein the second photosensitive element generates a second output signal when (merely) another part of said light impinges on the second photosensitive element, wherein said second output signal corresponds to the intensity of the part of the light impinging on the second photosensitive element; and adjusting the focal length to a predetermined focal length (e.g. by adjusting the curvature of a deformable surface/membrane of the lens or a refractive index of the lens) such that said first and/or second output signal or a further output signal generated from the first and second output signal (see e.g. further output signal X above) approaches a reference output signal, wherein said reference output signal corresponds to said predetermined focal length.

Preferably, a plurality of reference output signals (see also above) are pre-stored in a look-up table which assigns to each focal length of a plurality of focal lengths a corresponding reference output signal (see e.g. also above), which reference output signal is preferably determined by means of a calibration procedure where the respective focal length is determined using a further method which then yields the correspondence between the respective focal length and the first and/or second output signal or said further output signal, which signals are to be expected when the respective focal length is set.

Further, according to a preferred embodiment of the method according to the invention, a background noise generated by the first and by the second photosensitive element is measured when the light source does not emit light, wherein said background noise measured by the first photosensitive element is subtracted from the first output signal, and/or wherein said background noise measured by the second photosensitive element is subtracted from the second output signal.

In addition, or as an alternative, for reducing external noise in the first and/or second output signal (or in said further output signal), said emitted light may be emitted as modulated light, wherein the generated first and/or second output signal (or the further output signal) are then correspondingly demodulated and filtered by a band pass filter or low pass filter so as to filter out external noise in the first and second output signal (see also above).

According to a further aspect of the present invention, a contact lens for vision correction is disclosed, wherein the contact lens is configured to be placed directly on the surface of an eye of a user (e.g. person wearing the contact lens), wherein the contact lens comprises: a lens that is configured to be controlled so as to adjust the focal length of the contact lens, and wherein the contact lens further comprises at least one light source for emitting light (preferably an LED emitting preferably IR light) and at least one photosensitive element (preferably a photo diode) for detecting light emitted by the light source and for providing an output signal depending on the intensity distribution of the emitted light that impinges onto the photosensitive element, wherein said light source and said photosensitive element are configured such that light emitted by the light source is reflected by the lens of the eye of the user or the retina of the user before impinging onto said photosensitive element, when the contact lens is placed on the surface of the eye of the user as intended.

Further, according to a preferred embodiment of the contact lens, the light source and the photosensitive element are further configured such that the intensity distribution of the emitted light that impinges on the photosensitive element changes when the form of the lens of said eye of the user is changed and/or when the position of the contact lens on the surface of the eye changes (e.g. in a radial displacement), so that said output signal changes as well.

Further, according to a preferred embodiment of the contact lens according to the invention, the contact lens comprises a mechanism (e.g. deformation or refractive index change) so as to adjust the focal length of the contact lens, and a control unit for controlling said mechanism, wherein the control unit is configured to control said mechanism using said output signal (e.g. as a feedback signal or as a control signal for activating and/or deactivating said focus adjustment mechanism).

Preferably, the lens of the contact lens is formed by a (at least partially) transparent container comprising a transparent and elastically expandable membrane wherein the container is filled with a transparent fluid, so that light can pass through the contact lens via said the membrane and said fluid. Alternatively, the lens of the contact lens is formed of an liquid crystal lens.

Further, the membrane preferably comprises a curvature-adjustable area comprising a curvature that can be adjusted by means of said mechanism in order to adjust the focal length of the lens/contact lens.

According to a further aspect of the present invention, an optical device (e.g. glasses) for vision correction or virtual or augmented reality disclosed, wherein the optical device is configured to be placed or worn in front of an eye of a user, e.g. on a nose of a user (e.g. person wearing the optical device in form of glasses), wherein the optical device comprises: at least one lens that is configured to be controlled so as to adjust the focal length of the at least one lens or optical device, and wherein the optical device further comprises at least one light source for emitting light (preferably an LED emitting preferably IR light) and at least one photosensitive element (preferably a photo diode) for detecting light emitted by the light source and for providing an output signal depending on the intensity distribution of the emitted light that impinges onto the photosensitive element, wherein said light source and said photosensitive element are configured such that light emitted by the light source is reflected by the lens of the eye of the user or the retina of the eye of the user (in front of which eye said lens is arranged) before impinging onto said photosensitive element, when the glasses are worn by the user.

Further, according to a preferred embodiment of the optical device (e.g. glasses), the light source and the photosensitive element are further configured such that the intensity distribution of the emitted light that impinges on the photosensitive element changes when the form of the lens of said eye of the user is changed and/or when the position of the eye changes (e.g. looking inwards or downwards), so that said output signal changes as well.

Further, according to a preferred embodiment of the glasses according to the invention, the glasses comprise a mechanism (e.g. deformation or refractive index change) so as to adjust the focal length of the glasses, and a control unit for controlling said mechanism, wherein the control unit is configured to control said mechanism using said output signal (e.g. as a feedback signal or as a control signal for activating and/or deactivating said focus adjustment mechanism).

Further, in an embodiment, the optical device may provide vision correction for the one eye only and may thus only comprise said one lens. In another embodiment, said optical device provides vision correction for both eyes and may comprise a lens for one eye and a further lens for the other eye. Each lens is then arranged in front of the associated eye.

The further lens may also be focus adjustable and may be configured as described above. The focal length of the further lens may also be adjusted by the above-described means (e.g. simultaneously to the focal length of said lens). It is also conceivable that the focal length of each lens can be independently adjusted (e.g. each lens comprises the means for adjusting the focal length described above).

Preferably, the lens of the optical device (e.g. glasses) is formed by a (at least partially) transparent container comprising a transparent and elastically expandable membrane wherein the container is filled with a transparent fluid, so that light can pass through the glass via said the membrane and said fluid. Alternatively, the lens of the glass is formed of a liquid crystal lens.

Further, the membrane preferably comprises a curvature-adjustable area comprising a curvature that can be adjusted by means of said mechanism in order to adjust the focal length of the lens/glass.

By modulating the light source(s), which may be done in all embodiments of the present invention, the power consumption of the system can be strongly reduced.

Figure 2:
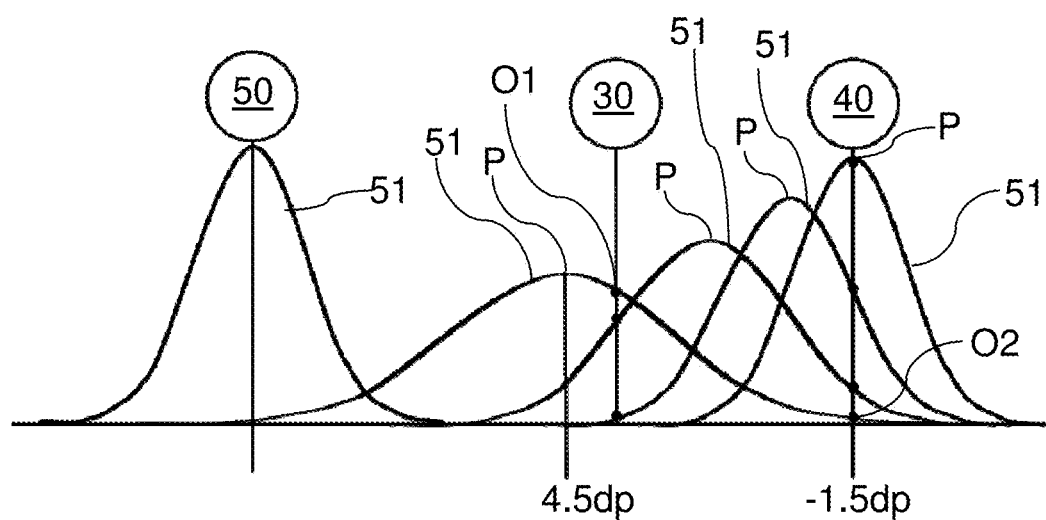
FIG. 2 Schematically depicts the light signals (intensity distributions) emitted by the light source towards the photosensitive elements as well as the corresponding output signals generated by the photosensitive elements.

FIGS. 1 and 2 show a schematical illustration of an optical device 1 according to the invention. Particularly, the optical device 1 is designed to focus or diverge a main optical signal (e.g. a light beam such as a laser light beam) 100. For this, the optical device 1 comprises a focus tuneable lens 10 that has a deformable surface 10*a* so that the surface 10*a* can assume a plurality of different curvatures each corresponding to a different focal length f of the lens 10 as shown on the left hand side of FIG. 1.

Said surface 10a may be formed by an elastically deformable membrane 11 of the lens 10 that is transparent for the main optical signal 100. The membrane 11 is arranged in a housing 2 of the optical device 1/lens 10 and faces (in the direction of the optical axis A) a first optical element 80 in the form of a (transparent) cover element 80, wherein the membrane 11 (which can be designed as described above) and said cover element 80 delimit a volume V of the lens 10 that is filled with a fluid F (which can be designed as described above).

In case a pressure is exerted on said volume, e.g. by means of an actuation means 20, the pressure of the fluid F increases due to the essentially constant volume V of the fluid F causing the membrane 11 to expand and said curvature of the membrane 11/surface 10a to increase. Likewise when the pressure on said volume V is decreased, the pressure of the fluid F decreases causing the membrane 11/surface 10a to contract and said curvature of the first membrane to decrease, as is shown on the right hand side of FIG. 1. Here, increasing curvature means that the membrane 11/surface 10a develops a more pronounced convex bulge, or that the membrane 11/surface 10a changes from a concave or a flat state to a convex one. Likewise, a decreasing curvature means that the membrane 11/surface 10a changes from a pronounced convex state to a less pronounced convex state or even to a flat or concave state, or changes from a flat or concave state to an even more pronounced concave state.

Hence, the curvature of the membrane 11/surface 10a of the lens 10 can be adjusted by means of the actuation means 20 and therewith the focal length f of the lens 10.

As shown in FIG. 1, the optical device 1 further comprises a second (transparent) optical element 90 being formed as a cover element 90 as well which runs parallel to the first optical element so that the membrane 11/surface 10a is arranged between these two optical elements 80, 90.

Further, for measuring and/or controlling said focal length f of the lens 10, the optical device 1 further comprises a light source 50 (e.g. such as an LED), wherein said light source 50 is arranged e.g. on an inner side of a lateral circumferential wall of the housing 2 of the lens 10 and is configured to emit light 51 such that said light 51 is reflected by the second optical element towards the surface 10a of the lens 10, is then deflected by the lens 10 towards the first optical element 80, is then reflected back towards the surface 10a of the lens 10, deflected by the lens 10, and finally reflected by the second optical element 90 onto a—depending on the actual curvature of the surface 10a—first and/or a second photosensitive element 30, 40, e.g. in the form of photo diodes 30, 40 that are arranged adjacent/close to each other on said inner side of the circumferential wall, too (e.g. facing the light source 50).

Preferably, the first photo diode 30 is designed to generate a first output signal O1 (e.g. in the form of an electrical current) corresponding to the intensity of the light 51 impinging on the first photo diode 30, and the second photo diode 40 is designed to generate a second output signal O2 corresponding to the intensity of the light 51 impinging on the second photo diode 40.

Figure 5:
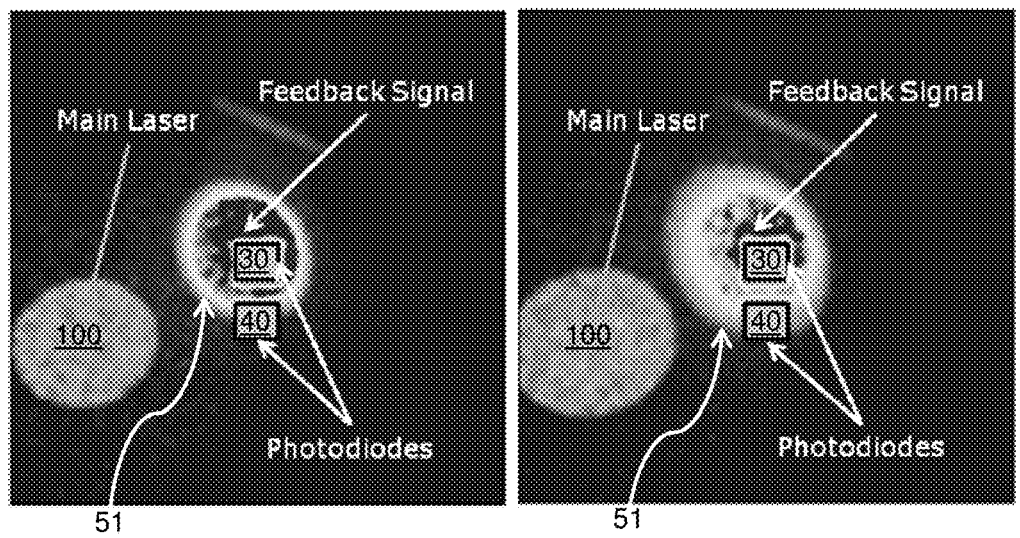
FIG. 5 Shows a measured feedback signal (i.e. light from the light source being affected (e.g. reflected) by the lens and impinging on the photosensitive elements.

As shown in FIGS. 2 and 5 such a configuration of photosensitive elements 30, 40 allows to determine the focal length f of the lens 10, since each curvature of the surface 10a or membrane 11 generates a specific first and second output signal O1, O2 so that the curvatures/focal lengths f can be distinguished. In other words (cf. FIG. 5) the light 51 (feedback signal) impinges differently on the two photo diodes 30, 40 depending on the curvature of the surface 10a or membrane 11 of the lens 10. However, the present invention also works with a single photosensitive element (e.g. photo diode etc.) 30. Preferably, two such elements (e.g. photo diodes) 30, 40 are used to account e.g. for any possible variation of the (LED) signal of the light source 50. In other words, to prevent any aging effects. When two photosensitive elements are present a further output signal X is preferably generated from the first and the second output signal O1, O2, which is $X=(O1-O2)/(O1+O2)$.

Due to the configuration of the optical device 1, the intensity distribution of the light 51 of the light source 50 which is shown in FIG. 2 for different focal lengths f of the lens 10 not only changes its widths when the focal length is changed, but also the position of the peak P of the distribution 51 is shifted when the focal length is changed. Since the photosensitive elements 30, 40 are generally configured such in all embodiments of the present invention that they detect only a part of the intensity distribution of the light 51 from the light source 50, the intensity of the detected light 51 changes significantly with changing focal length of the lens 10. While the changing width of the distribution alone allows for identifying different focal lengths of the lens 10, the feature that the optical device 1 can be configured such that the peak P of the (reflected) light 51 impinging on the respective element 30, 40 is shifting, further enhances the signal difference. These features of the present invention are also illustrated in FIG. 5, which shows a main optical signal 100 that is focused or diverged by the lens 10, but does clearly not interfere with the light 51 from the light source 50 (feedback signal). In the left-hand panel of FIG. 5 a different focal length of the lens 10 is adjusted compared to the right-hand panel of FIG. 5. Correspondingly, the photo sensitive elements (e.g. photo diodes) 30, 40 are hit differently from the signal 51 in these two panels.

Further, as can also be inferred from FIG. 5, said light source 50, said photosensitive elements 30, 40 and particularly said first and/or second optical element 80, 90 are arranged such with respect to each other that the main optical signal (main laser) 100 does not impinge on the photo diodes 30, 40, i.e. does not affect said first and second output signal O1, O2.

Now, for controlling the focal length f of the lens 10, so that the latter can be automatically adjusted to a predetermined focal length, the optical device 1 comprises a control unit 60 as shown in FIG. 1 which is adapted to control said actuation means 20 such that the latter deforms said surface 10a of the lens 10 in a way that said first and/or second output signal O1, O2 approaches a reference output signal, wherein preferably said surface 10a of the lens 10 is deformed in a way that said further output signal X approaches a reference output signal. These reference output signals are calibrated, i.e., correspond to the respective predetermined focal length f that is to be adjusted.

Preferably, the optical device 1 comprises a memory 70 in which a plurality of focal lengths as well as plurality of corresponding reference output signals are stored, wherein a reference output signal is assigned to each focal length.

The correspondence between the first and/or second output signals O1, O2 or said further output signal X on one side and the focal lengths on the other side can be established by using another method for determining the focal length of the lens 10 (e.g. a Shack-Hartmann sensor). Then the individual focal length can be adjusted and the corresponding first and second output signal O1, O2 or further output signal X are measured and later stored e.g. in said look-up table in memory 70.

Figure 3:
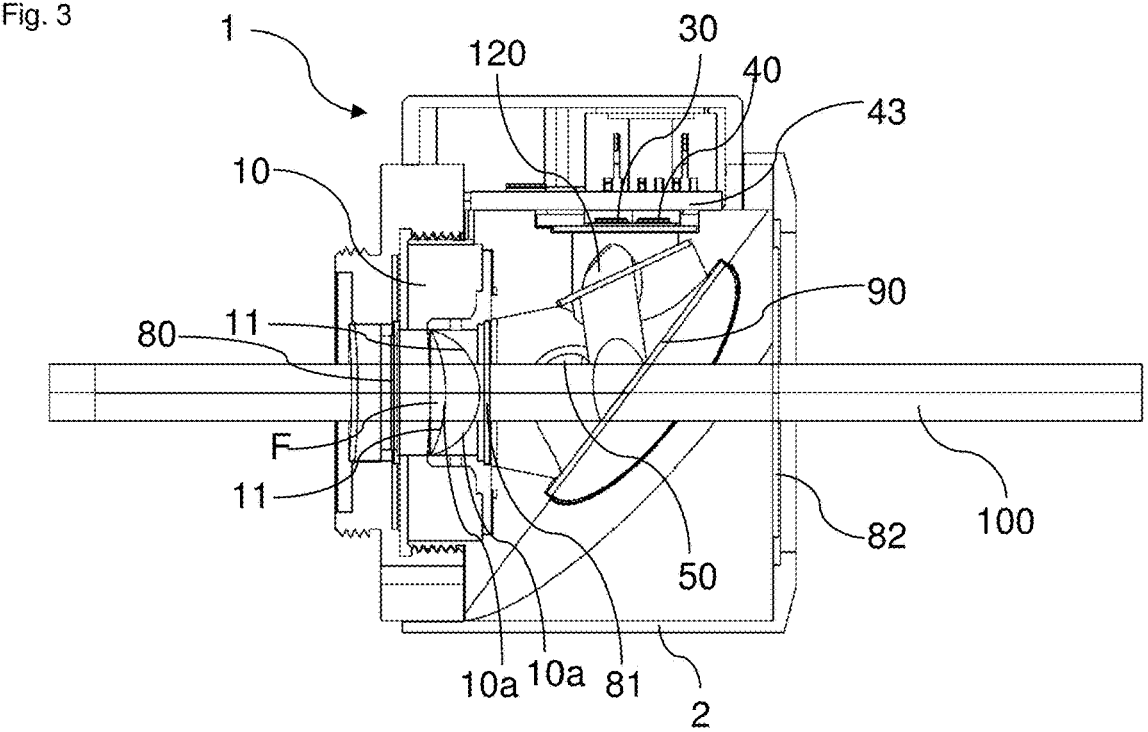
FIG. 3 Shows a schematic cross sectional view of further embodiments of an optical device according to the invention.
Figure 4:
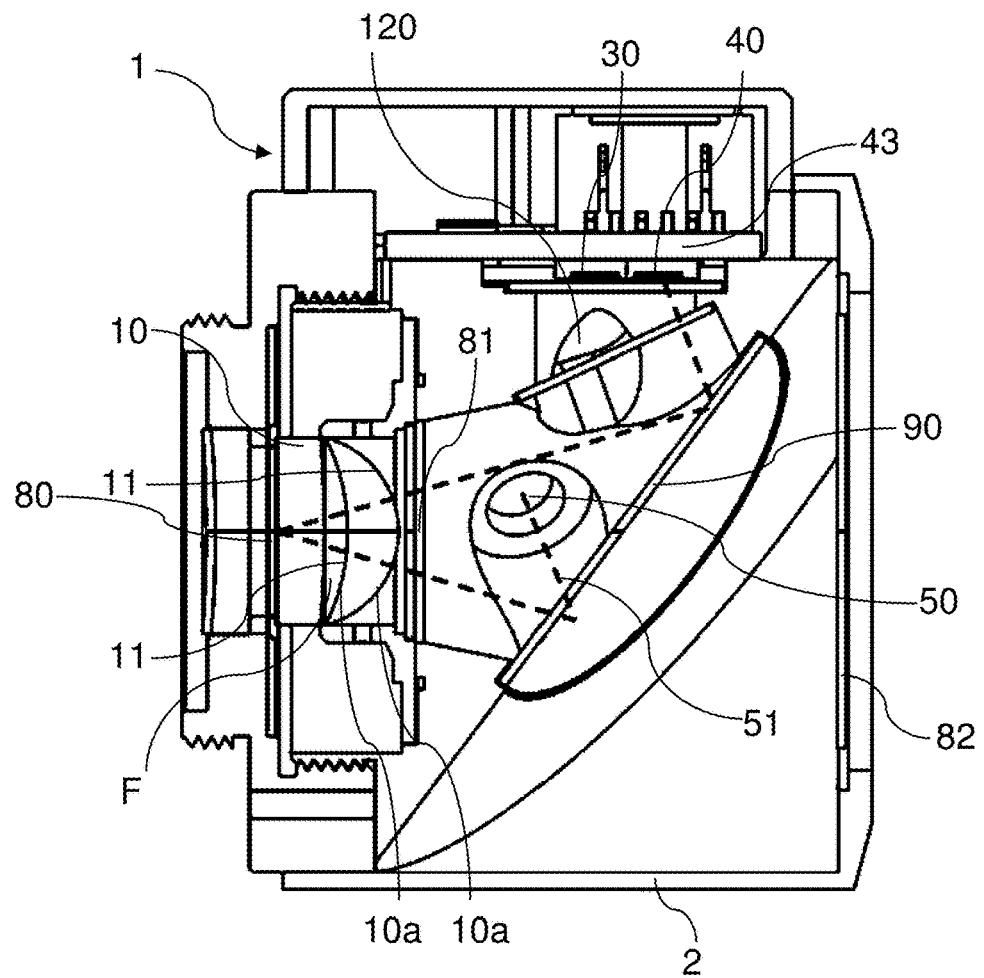
FIG. 4 Shows a schematic cross sectional view of additional embodiment of an optical device according to the invention.

FIGS. 3 and 4 show a further embodiment of an optical device 1 according to the invention, wherein the lens 10 is configured as shown in FIG. 1 and has a first optical element 80 in the form of a first cover element 80, a second cover element 81 (corresponding to cover element 90 in FIG. 1) as well as a second optical element 90 which is an optical window (for light 51) that is inclined with respect to the lens 10 and the transparent cover elements 80, 81 and which is partly transmissive for the main optical signal 100 extending along the optical axis through the lens 10, wherein light of the main optical signal 100 that is reflected by the second optical element 90 is collected in a laser dump 120 for absorbing said reflected light. The first cover glass 80 and the second optical element 90 are transparent for the main optical signal 100 and reflective for the signal light 51. Cover glass 81 is transparent for both optical signals and can also be omitted. It is to be noted that FIGS. 3 and 4 both show two different states of the membrane 11.

Now, in contrast to the embodiment shown in FIG. 1, the light source (e.g. LED) 50 is arranged such that light 51 generated by light source 50 is reflected by the second optical element 90 towards the lens 10, enters the second cover element 81 and lens 10, is reflected on the first cover element 80 towards the second optical element 90, and is then reflected onto the first and/or second photosensitive element (e.g. photo diode) 30, 40 depending on the focal length f or curvature of the membrane 11/surface 10*a* (cf. FIG. 4 dashed line).

Here, the two photosensitive elements 30, 40 are integrated into a printed circuit boards that also comprise an interface to the control unit 60 and particularly memory 70 as shown in FIG. 1.

Figure 6:
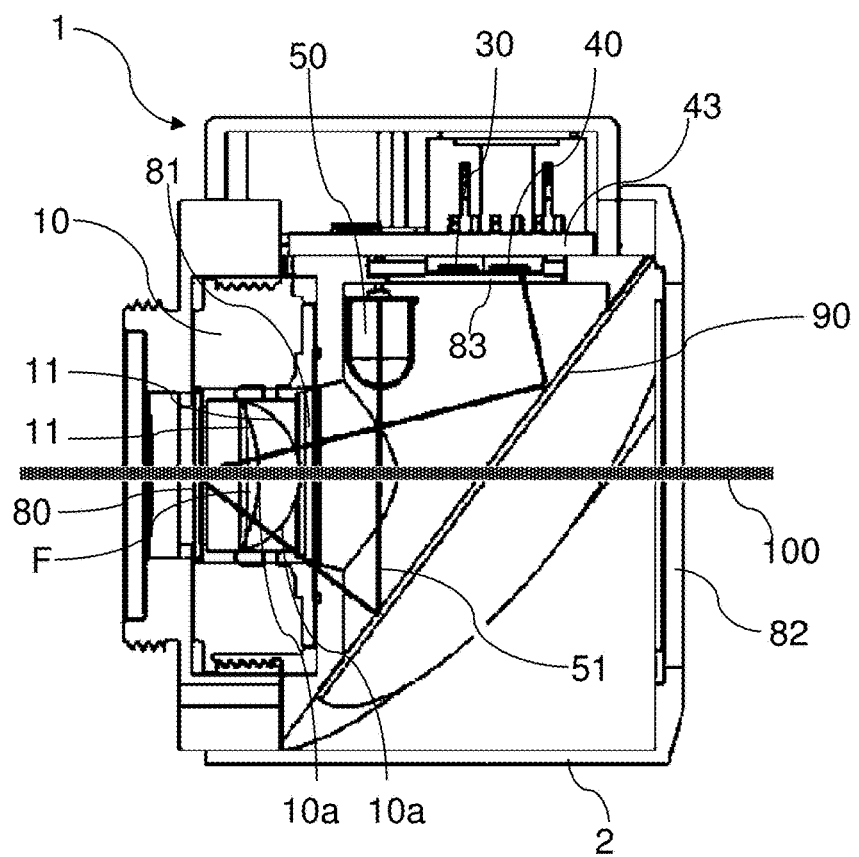
FIG. 6 Shows a modification of the embodiment shown in FIGS. 3 and 4.

FIG. 6 (showing also two different states of the membrane 11) shows a modification of the embodiment shown in FIG. 4, where now in contrast to FIG. 4 the light source 50 is integrated onto the printed circuit board, too, and is thus arranged adjacent said photosensitive elements 30, 40. In both embodiments (FIGS. 3, 4 and FIG. 6), the printed circuit board is arranged on a lateral inner side of the housing 2 of the lens 10 that extends parallel to the optical axis A. Furthermore, the printed circuit board also has connections for the lens 10 and the light source 50.

Figure 7:
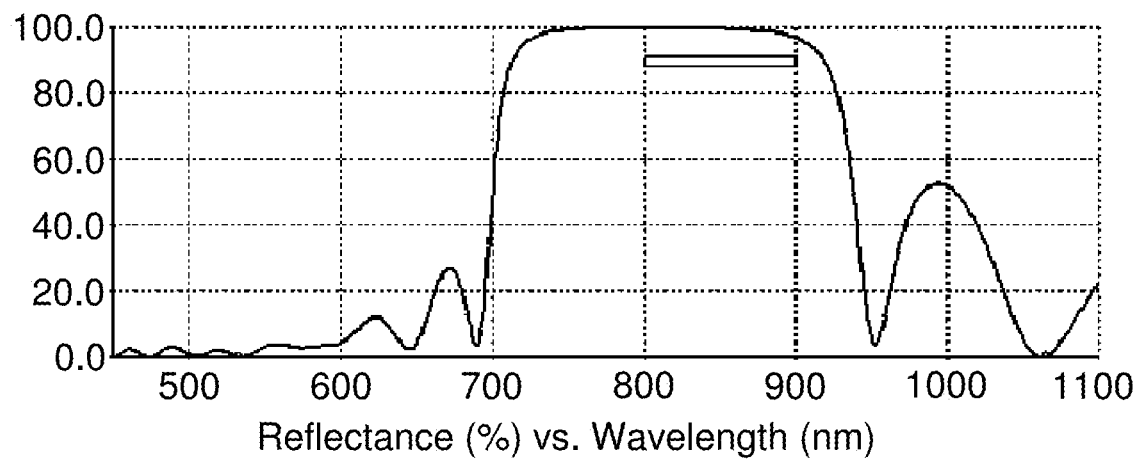
FIG. 7 Shows reflectance and transmittance of the first and second optical element as well as of a cover element of the photosensitive elements for the embodiment shown in FIG. 6.
Figure 8:
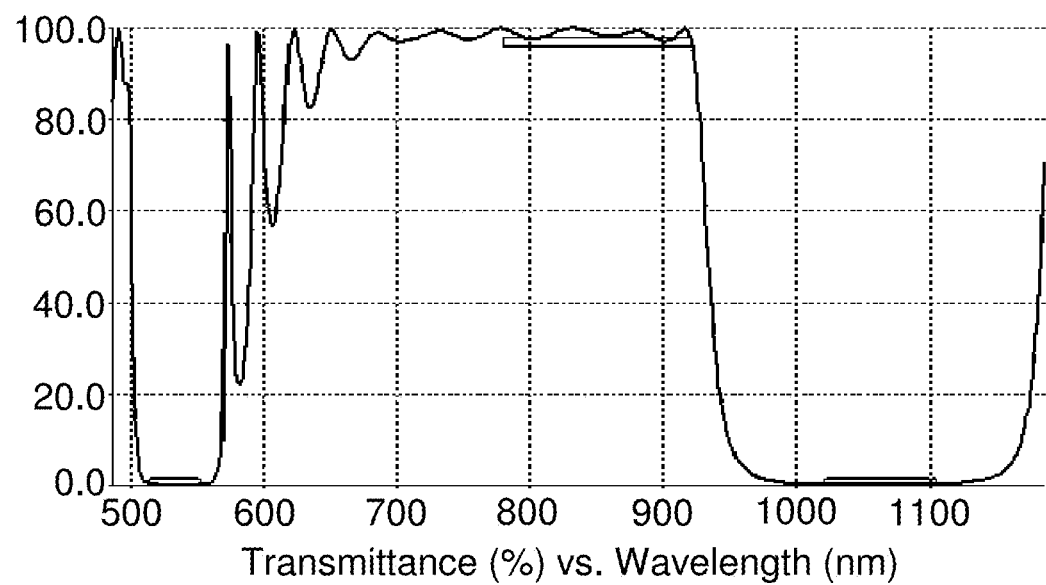
FIG. 8 Shows reflectance and transmittance of the first and second optical element as well as of a cover element of the photosensitive elements for the embodiment shown in FIG. 6.
Figure 9:
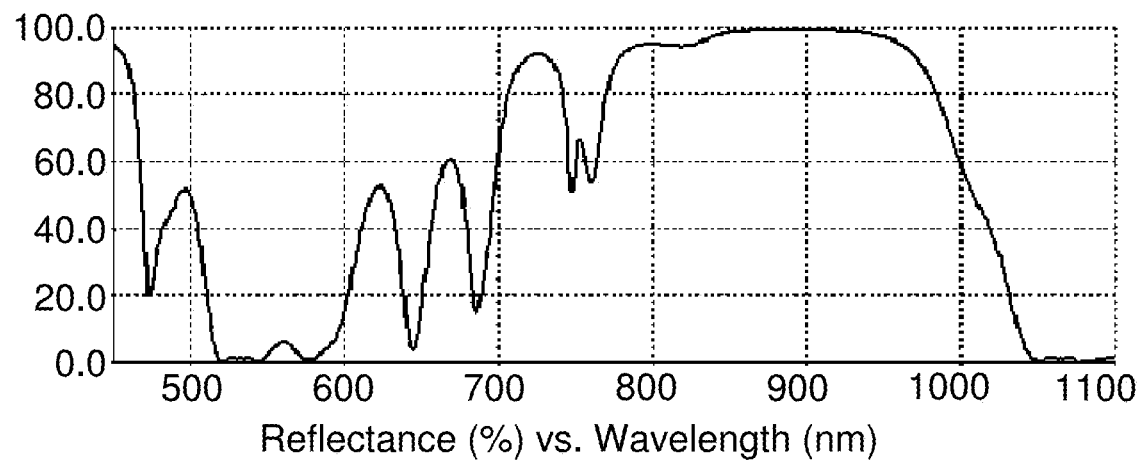
FIG. 9 Shows reflectance and transmittance of the first and second optical element as well as of a cover element of the photosensitive elements for the embodiment shown in FIG. 6.
Figure 10:
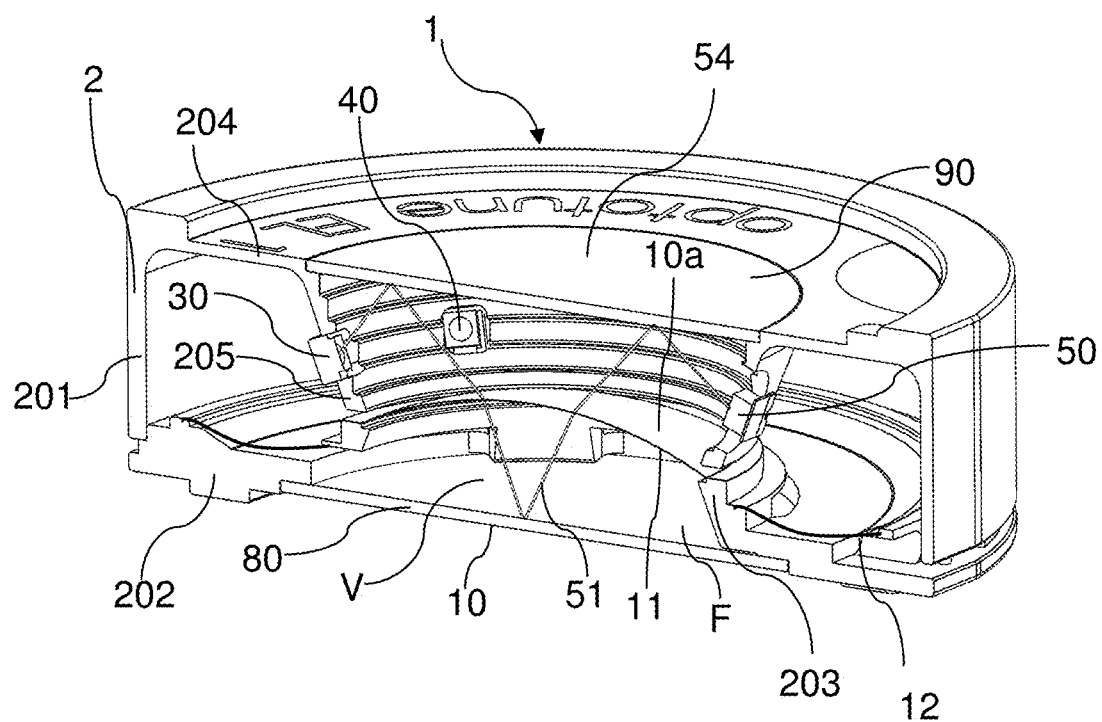
FIG. 10 Shows a perspective cross sectional view of a further embodiment of an optical device according to the invention involving a reflection of the light emitted by the light source on the first and the second optical element (here cover elements/glasses)

In conjunction with FIG. 6, FIG. 7 shows a preferred reflectance of the first optical element 80 (first cover element) with respect to the impinging light 51 of the light source 50. According thereto, the reflectance is preferably essentially 100% for light 51 having a wavelength in the range from 750 nm to 900 nm, which wavelengths are preferably used for the light 51 of light source 50. Further, as shown in FIG. 9, a preferred reflectance of the second optical element 90 for light in the range from 750 nm to 950 nm is again very high (nearly 100%), so that a good reflection of light 51 can be assured. Further, the cover element 83 covering the photo diodes 30, 40 of the embodiment shown in FIG. 6 preferably has a very good transmittance as shown in FIG. 8, so that the light 51 actually reaches said photosensitive elements 30, 40 with certainty. Furthermore, it has close to 100% reflectance for typical wavelengths of the main optical signal in particular 532 nm and 1064 nm. FIG. 10 shows a further embodiment of an optical device 1 according to the invention, which is essentially configured as shown in FIG. 1, i.e., comprises a lens 10 having a first and a second optical element 80, 90 in the form of transparent cover elements 80, 90, wherein the deformable membrane 11 defining surface 10*a* is arranged between said two cover elements 80, 90. The housing 2 of the lens 10/optical device 1 comprises a circumferential wall 201 surrounding the membrane 11, wherein a first annular member 202 is connected to said wall 201, which first annular member 202 holds the (circular) first optical element 80, as well as a second annular member 204 which holds the second optical element 90. Further, said first annular member 202 comprises a circumferential edge region 203 to which said membrane 11 is fastened. Likewise, the second annular member 204 comprises a circumferential edge region 205. By pushing (e.g. by means of an actuation means 20) on an outer membrane part 12 that is not optically active, the fluid F is pushed from the outer region into the central fluid volume section and the lens 10 becomes more convex (or less convex when the pressure is decreased). This allows one to adjust the focal length f of the lens 10.

As shown in FIG. 10, the photosensitive elements 30, 40 as well as the light source 50 are arranged on the same side of the membrane 11/surface 10*a*, namely on the second annular member 204, so that the light 51 is reflected as described with respect to FIG. 1, wherein particularly the two photosensitive elements 30, 40 are arranged adjacent to each other in a circumferential direction of the second annular member 204, wherein they face the light source 50 which is arranged on the other side or the second annular member 204.

Figure 11:
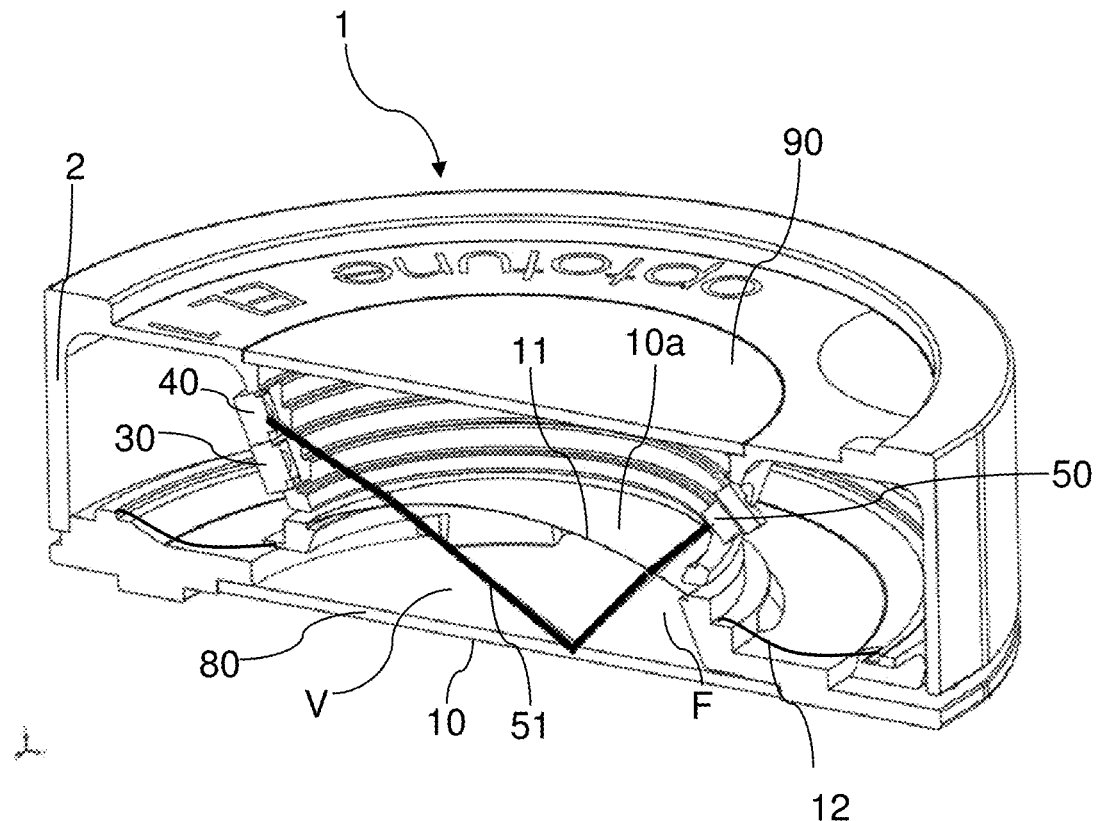
FIG. 11 Shows a perspective cross sectional view of a further embodiment of an optical device according to the invention involving only a single reflection of the light emitted by the light source on the first optical element (here cover element/glass)

Further, the optical device 1 may comprises at least one optical filter 54 configured to prevent light of the first light source 50 (particularly also of a further light source 52 when present) from exiting or re-entering the optical device 1 and/or lens 10. Particularly, the second optical element 90 may be provided with such a filter 54. Such filters may also be used in the other embodiments described herein. FIG. 11 shows a modification of the embodiment shown in FIG. 10, wherein the photosensitive elements 30, 40 and the light source 50 are arranged such that the light 51 is merely reflected by the first optical element 80 (and deflected by the lens 10) when travelling to the photosensitive elements 30, 40. Particularly, the photosensitive elements 30, 40 are now arranged adjacent to each other in the direction of the optical axis running perpendicular to the first and second optical element 80, 90. Also in this embodiment, the light source 50 and photosensitive elements 30, 40 are on the side of the tunable lens 10 which has no fluid F, making the assembly process simpler. Furthermore, the light 51 crosses the membrane 11/surface 10*a* twice, resulting in a stronger optical effect and therefore stronger feedback signal.

Figure 12:
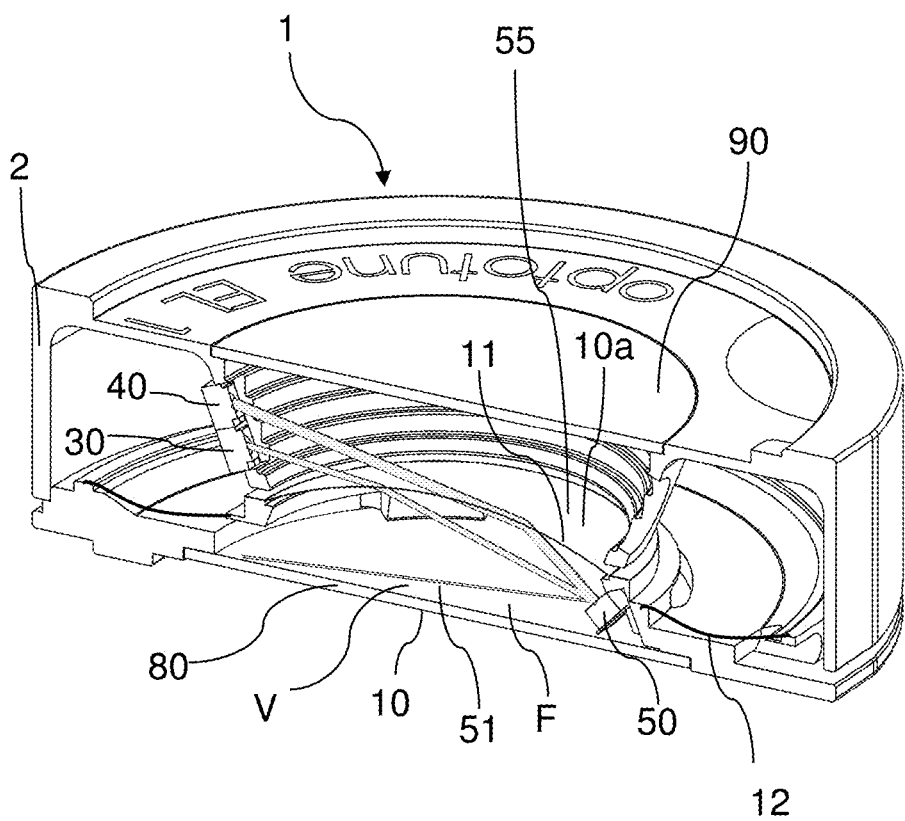
FIG. 12 Shows perspective cross sectional views of a further embodiment of an optical device according to the invention involving no reflection of the light emitted by the light source on the first and the second optical element (here cover elements/glasses)
Figure 13:
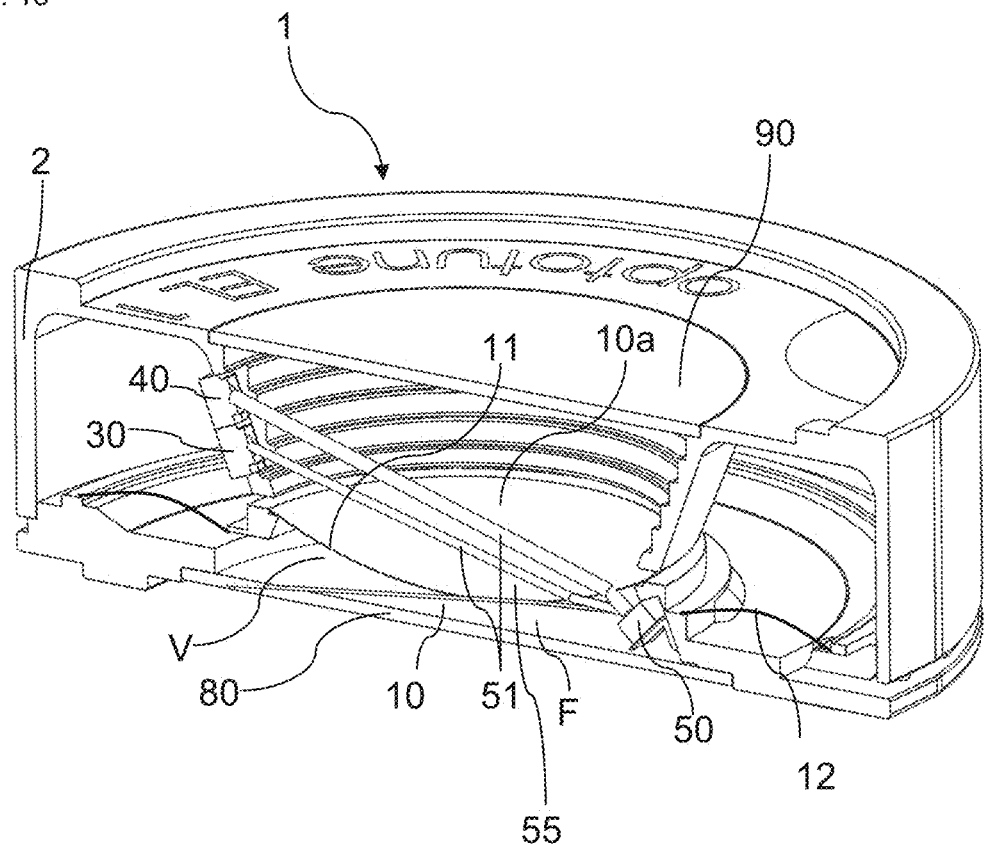
FIG. 13 Shows perspective cross sectional views of a further embodiment of an optical device according to the invention involving no reflection of the light emitted by the light source on the first and the second optical element (here cover elements/glasses)

FIGS. 12 and 13 shows a modification of the embodiment shown in FIG. 10, wherein the photosensitive elements 30, 40 and the light source 50 are arranged such that the light 51 is merely deflected by the lens 10 when travelling to the photosensitive elements 30, 40. For this, in contrast to FIG. 11, the light source 50 is now arranged on the other side of the membrane 11 with respect to the photosensitive elements 30, 40 which are arranged as described with respect to FIG. 11.

Further, in FIGS. 12 and 13 the lens 10 may be configured to affect said emitted light 51 by means of light scattering and/or refraction, wherein particularly the optical device 1, particularly the lens 10, may comprises at least one diffractive element for generating said light scattering, wherein particularly said at least one diffractive element 55 is arranged on the membrane 11 or comprised by the membrane 11. Such elements 55 may also be used in other embodiments.

Figure 16:
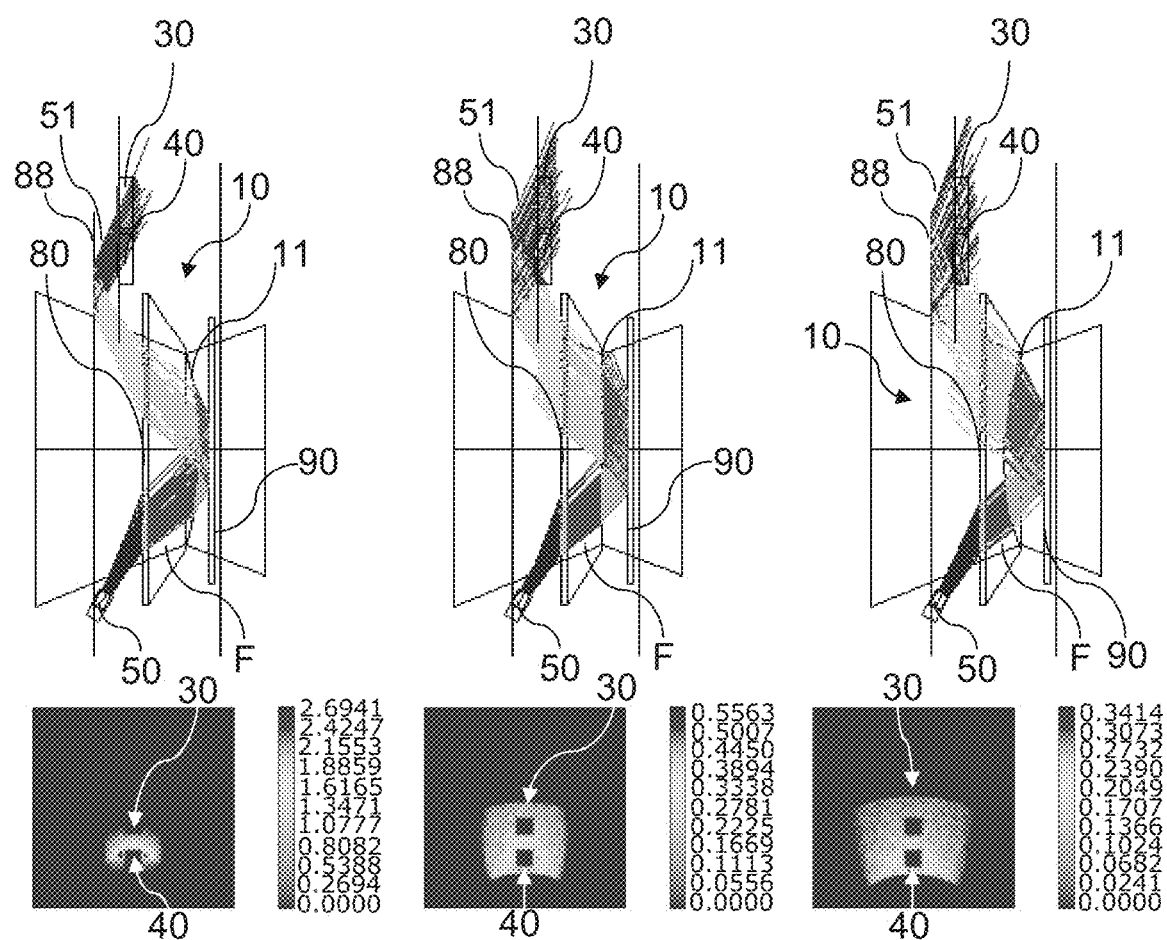
FIG. 16 Shows a schematical view of a further embodiment of the optical device according to the invention, where the light source and the photosensitive elements are arranged outside the housing of the lens.

FIG. 16 shows a schematical view of a further embodiment of the optical device 1 according to the invention, where the light source 50 and the first and second photosensitive element (e.g. photo diodes) 30, 40 are arranged outside the housing 2 of the lens 10, which is configured in principle as shown in FIG. 1. Here, the light source 50 and the photo diodes 30, 40 are arranged on the side of the first optical element 80 (e.g. cover glass) on which side also the photosensitive elements 30, 40 are arranged, namely adjacent to each other in a plane running parallel to the cover glass 80, wherein the first photosensitive element 30 is arranged above the second photosensitive element 40 so that the second photosensitive element 40 is arranged between the first one 30 and the optical axis. The membrane 11 of the lens 10 is arranged between the first and the second cover glass 80, 90 (the fluid F is arranged between the first cover glass 80 and the membrane 11), wherein the second optical element (second cover glass) 90 is reflective for the light 51. In order to reflect the light 51 from the light source 50 finally back onto the photosensitive elements 30, 40 a mirror 88 is present that extends parallel to the plane of the cover glass on said side of the cover glass 80 where also the elements 30, 40 and the light source 50 are arranged.

In FIG. 16 the afore-described configuration is shown for three different focal lengths of the lens 10. The respective panels in the lower row show the corresponding intensity distribution of the light 51 that impinges onto the elements 30, 40.

Figure 14:
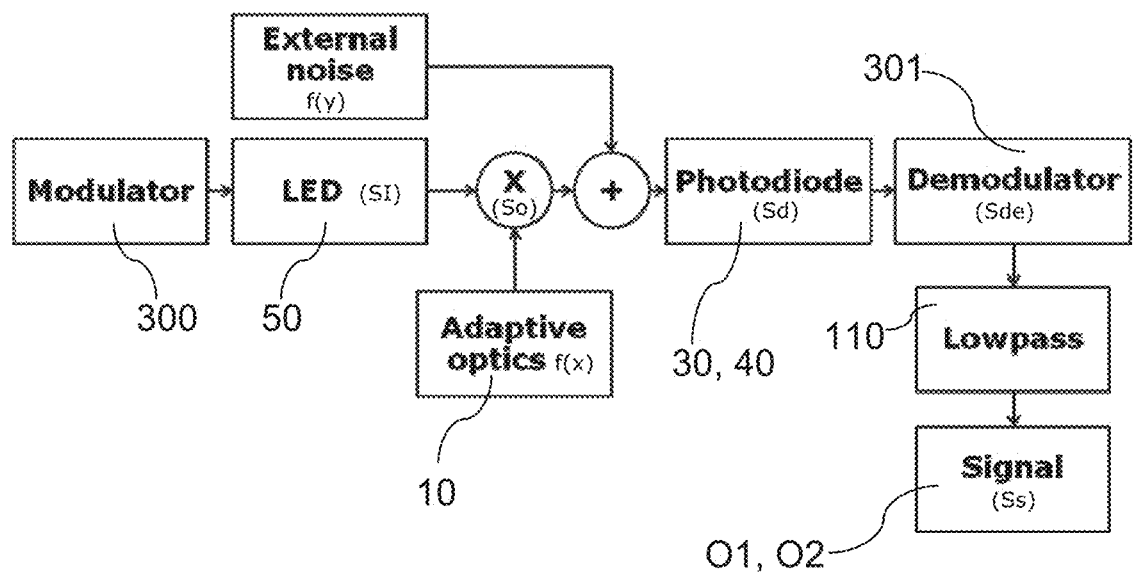
FIG. 14 Shows a block diagram for removing noise from the output signals by modulating the light emitted from the light source.

Further, as shown in FIG. 14, for reduction of external noise (which can be conducted in all embodiments), the light 51 generated by the light source 50 is modulated by means of a modulator 300, so that the intensity $S_I$ of the light 51 takes e.g. the form $$S_I = V_I \cdot \sin(\omega \cdot t)$$

where ω is the modulation frequency. The adaptive optics, i.e., lens 10 modifies said intensity as follows when adjusting the curvature:

$$S_o = f(x) \cdot V_I \cdot \sin(\omega \cdot t)$$

wherein external noise f(y) is added to this signal which then reads:

$$S_d = f(x) \cdot V_I \cdot \sin(\omega \cdot t) + f(y)$$

This intensity is detected by the photosensitive means 30, 40.

In order to remove the noise f(y), a demodulator 301 is configured to demodulate this signal by multiplying the function sin(ω·t) to the detected intensity $S_d$ yielding $$S_{de} = f(x) \cdot V_I \cdot \sin(\omega \cdot t) \cdot \sin(\omega \cdot t) + f(y) \cdot \sin(\omega \cdot t)$$

which corresponds to $$S_{de} = (1/2) \cdot f(x) \cdot f(x) \cdot V_1 - f(x) \cdot V_I \cdot (1/2) \cdot \cos(2 \cdot \omega \cdot t) + f(y) \cdot \sin(\omega \cdot t)$$

Now, the parts varying with frequency 2·ω and ω can be filtered out by means of a corresponding band-pass or low-pass filter 110. So that the clean output signal $$S_s = (1/2) \cdot f(x) \cdot V_1$$

remains.

Figure 15:
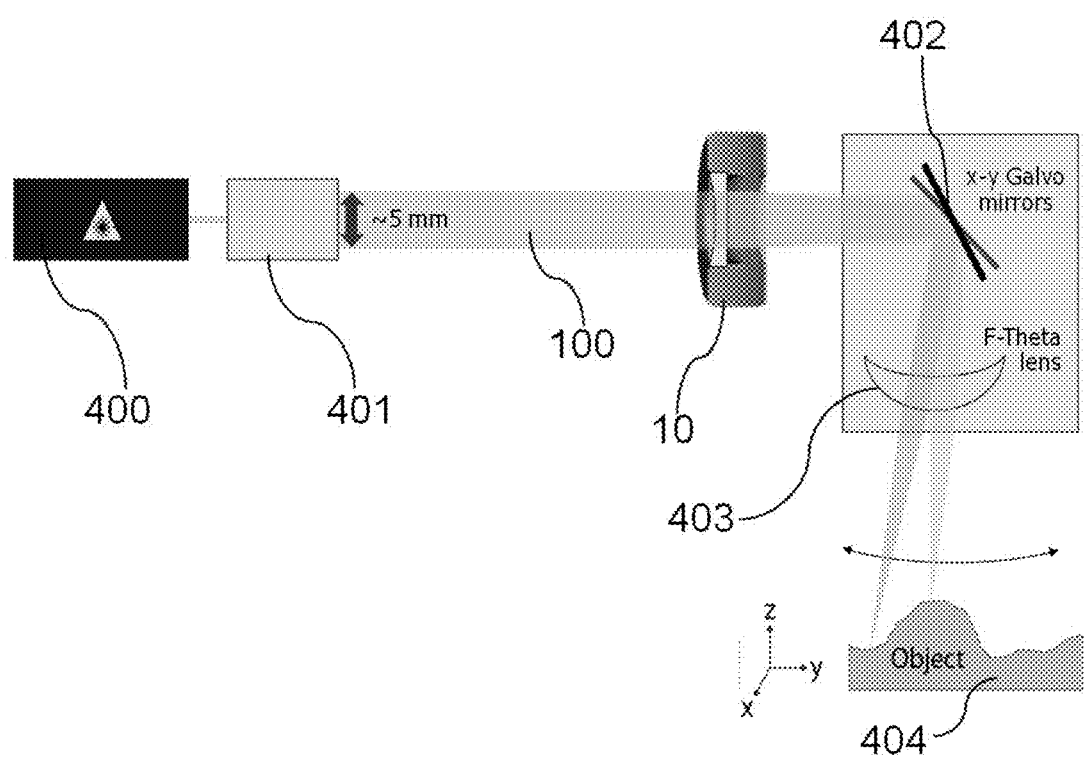
FIG. 15 Schematically shows the position of the device according to the invention in the optical path of a laser light processing system.

Finally, FIG. 15 shows possible applications of the optical device 1 according to the invention in laser light processing systems. In this regard, FIG. 15 shows an optical system 1 in form of a laser marking equipment 1 that is designed to focus a laser light beam 100 generated by a laser 400 of the device 1 onto a three-dimensional surface of an object 404. For this, the generated laser light beam 100 is send through an optional beam expander 401 for widening the diameter of the laser light beam 100 (e.g. to a diameter of 5 mm). Now, in order to converge/focus the laser light beam 100, a lens 10 according to the invention as described herein having an adjustable focus f (e.g. in the range from +400 mm to −600 mm) can be positioned in the optical path either in front of the beam expander 401, in the beam expander 401, or after the beam expander (in front of a mirror means 402 for deflecting the laser light beam 100 onto the surface of said object 404). After focusing/converging the laser light beam 100 by means of the lens 10, the laser light beam 100 is deflected by a mirror means 402 towards an F-Theta lens 403 and then focused on the surface of said object 404. Due to the mirror means 402 and the focus adjustable lens 10, the laser light beam 100 can be focused in three dimensions x, y, z as illustrated in FIG. 15. The mirror means 402 (e.g. mirrors mounted onto x-y Galvo-scanners) can be a single mirror that can be pivoted (in two dimensions) about two independent axes or can be comprised of two mirrors which are each pivotable about an axis, the two axes being orthogonal with respect to each other. In such an optical system 1, the F-theta lens can also be omitted or additional lenses can be added to the light path of the laser light beam 100 to achieve e.g. small spot sizes.

Figure 17:
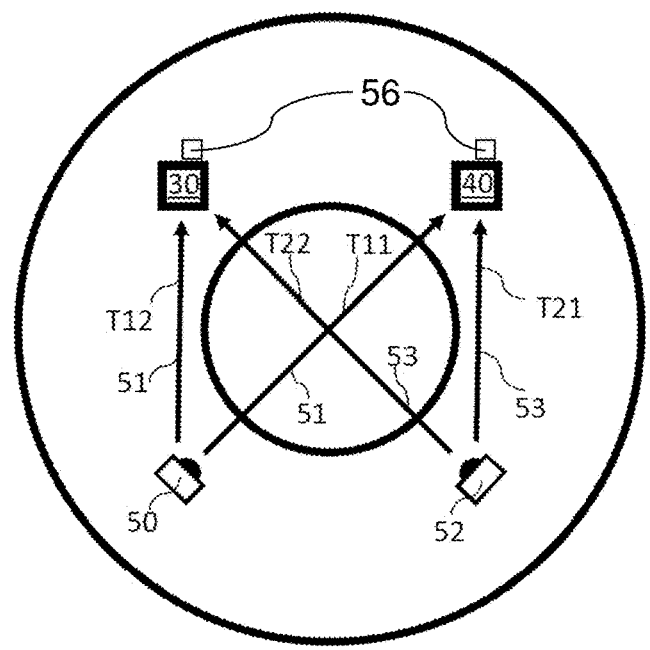
FIG. 17 Shows a schematical configuration of the optical device using two light sources and two photosensitive elements, FIG. 18 Shows another perspective cross sectional view of a further embodiment of an optical device according to the invention.

Further, FIG. 17 shows a configuration using two light sources 50, 52 (e.g. LED) and two photosensitive elements (30, 40). This configuration may be used in conjunction with all embodiments described herein. Particularly, here, each light path T11, T12 from the light source 50 to one of the photosensitive elements 30, 40 is symmetric to a corresponding light path T21, T22 from the further light source 52 to one of the photosensitive elements 30, 40. Advantageously, this allows for the normalization of all photosensitive elements 30, 40 and light source efficiencies/sensitivities.

Figure 18:
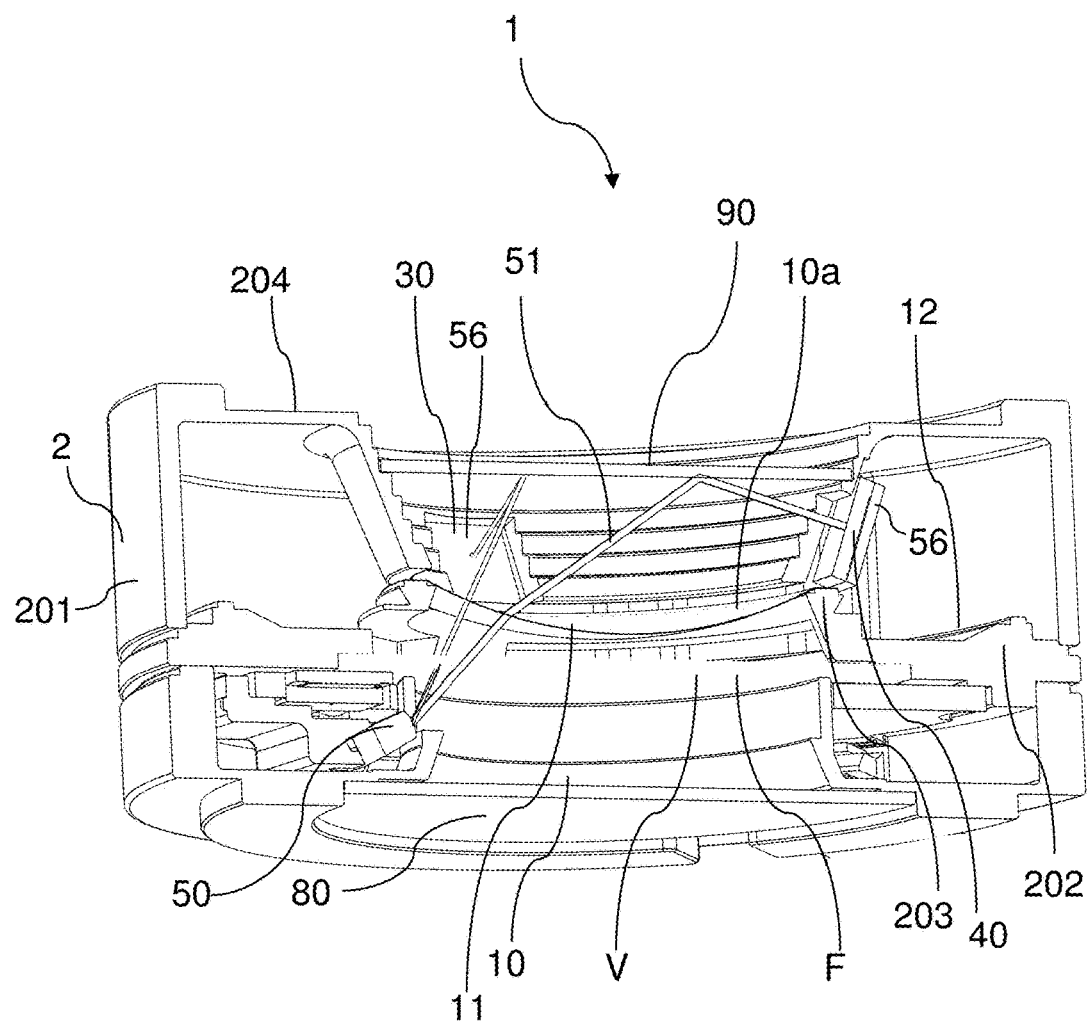

Further, FIG. 18 shows a further embodiment of an optical device 1 according to the invention, which comprises a lens 10 having a first and a second optical element 80, 90 in the form of transparent cover elements 80, 90, wherein the deformable membrane 11 defining surface 10a is arranged between said two cover elements 80, 90. Further, the optical element 1 comprises a housing 2 that has a circumferential wall 201 surrounding the membrane 11, wherein a first annular member 202 is connected to said wall 201, which first annular member 202 holds the (circular) first optical element 80, as well as a second annular member 204 which holds the second optical element 90. Further, said first annular member 202 comprises a circumferential edge region 203 to which said membrane 11 is fastened.

Furthermore, as indicated in FIGS. 17 and 18, the optical device 1 may comprises at least one temperature sensor 56 (or several such sensors 56 for each photosensitive element (e.g. photo diode) 30, 40 being in thermal contact with the first and/or second photosensitive element 30, 40, wherein particularly the optical device 1 is configured to use said at least one temperature sensor 56 for compensating a temperature-dependent sensitivity of the first and/or second photosensitive element 30, 40. These kind of temperature sensors 56 and compensation means may also be present in the other embodiments.

By pushing (e.g. by means of an actuation means 20) on an outer membrane part 12 that is not optically active, the fluid F is pushed from the outer region into the central fluid volume section and the lens 10 (namely inner part of membrane 11) becomes more convex (or less convex when the pressure is decreased). This allows one to adjust the focal length f of the lens 10.

As shown in FIG. 18, the photosensitive elements 30, 40 are arranged outside the lens 10 while the light source 50 irradiates the photosensitive elements 30, 40 through the membrane 11 such that the emitted light 51 is reflected on the second cover element 90 before impinging on the elements 30, 40.

Further, FIGS. 19 to 22 show cross sectional views of an aspect and embodiment of the present invention, wherein here, the optical device forms a contact lens 1 that is configured to be placed directly onto a surface 300a of an eye 301 of a user, namely on top of the pupil of the eye 300. The contact lens 1 comprises at least a lens 10 that is configured to be modified so as to adjust the focal length of the contact lens.

Further, the contact lens 1 comprises a light source 50 for emitting light 51 (particularly IR light so that the eye is not disturbed) and a photosensitive element 30, which may be a photo diode, for detecting emitted light 51 from source 50 and for providing an output signal depending on the intensity of the emitted light 51 that impinges onto the photosensitive element 30.

According to the invention, said light source 50 and said photosensitive element 30 are arranged such on the contact lens 1 that light emitted 51 by the light source 50 is reflected by the lens 301 of the eye 300 of the user before impinging onto said photosensitive element 30, when the contact lens is properly worn by the user.

Preferably, the light source 50 and the photosensitive element 30 are further configured such that the intensity distribution of the emitted light 51 that impinges on the photosensitive element 30 changes when the form of the lens 301 of said eye 300 of the user is changed and/or when the position of the contact lens 1 on the surface 300a of the eye 300 is changed (i.e. due to a radial displacement of the contact lens 1 so that the contact lens is off center in a radial direction), so that said output signal changes as well.

Such arrangement of the source 50 and element 30 can e.g. be found by simulating the emitted light as shown in FIGS. 19 to 22.

Further, the contact lens 1 preferably comprises a mechanism 303 for adjusting the focal length of the lens 10, and a control unit 304 for controlling said mechanism 303, wherein the control unit is configured to control said mechanism 303 using said output signal.

Figure 19:
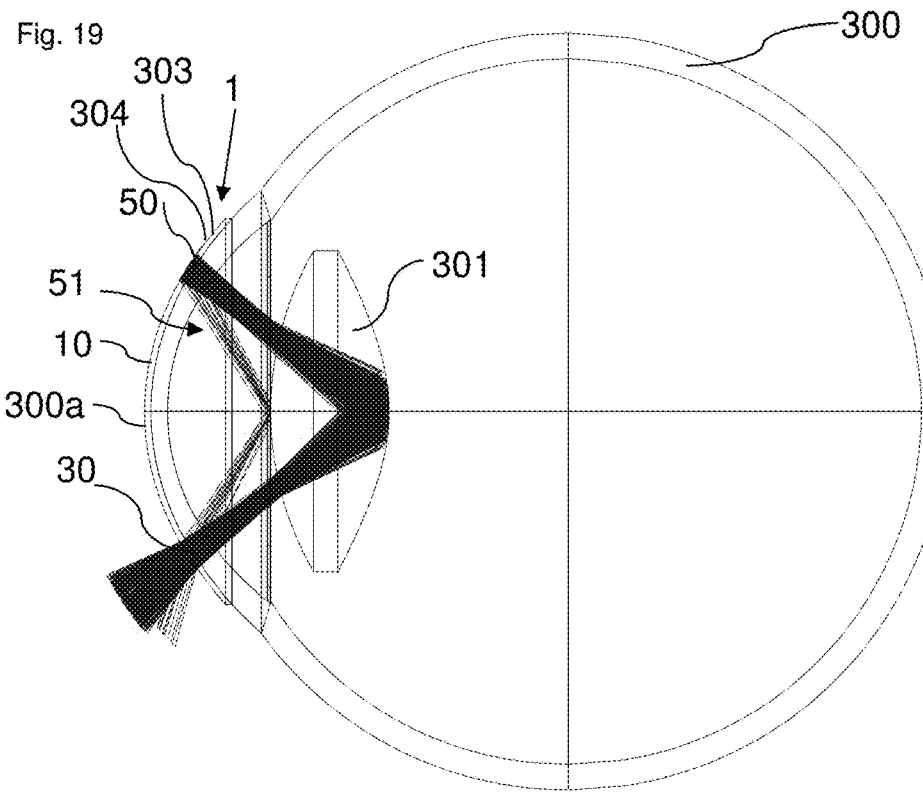
FIG. 19 Shows an optical device according to the invention in the form of a contact lens, on which eye said contact lens is arranged, and then impinges onto a photosensitive element which provides an output signal e.g. for controlling the focal length of the contact lens.

In detail, FIG. 19 shows the situation of an accommodation of the eye 300 to 0 D (diopter), wherein the output signal of the photosensitive element corresponds to a light intensity of 0.68% of the source intensity (i.e. intensity of light 51 emitted by light source 50).

Figure 20:
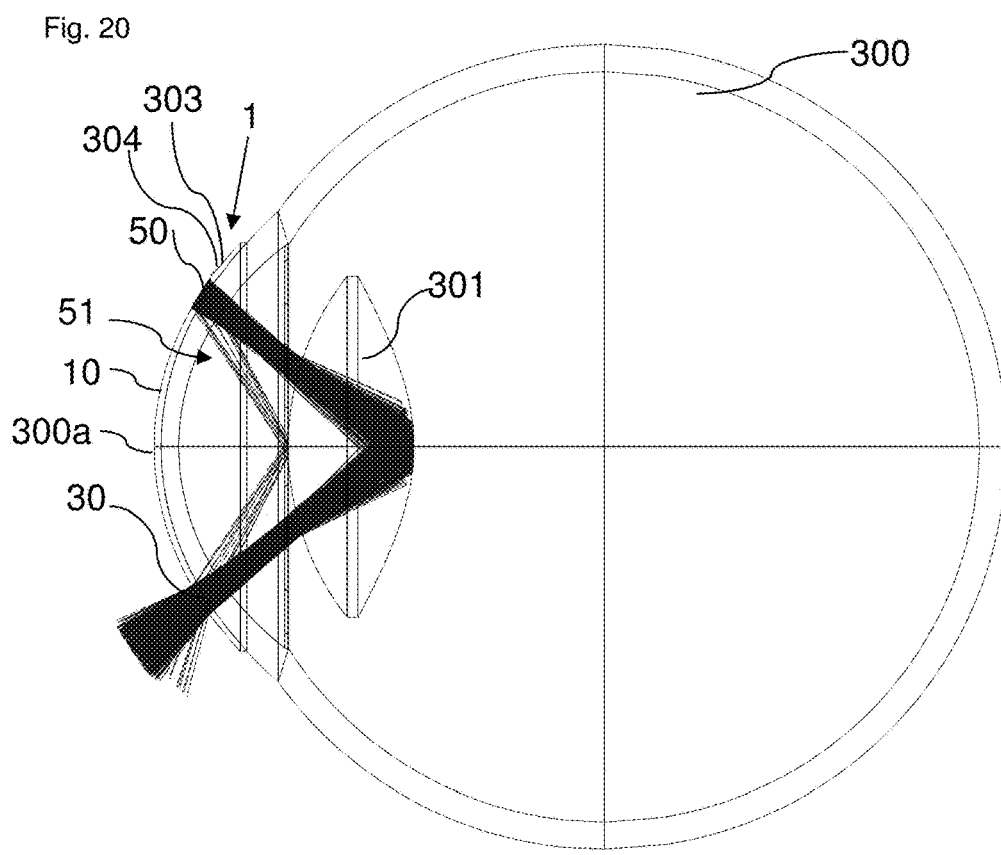
FIG. 20 Shows an optical device according to the invention in the form of a contact lens, on which eye said contact lens is arranged, and then impinges onto a photosensitive element which provides an output signal e.g. for controlling the focal length of the contact lens.

Further, in FIG. 20, the accommodation of the eye 300 is 2D, wherein the output signal of the photosensitive element corresponds to a light intensity of 0.63% of the source intensity.

Figure 21:
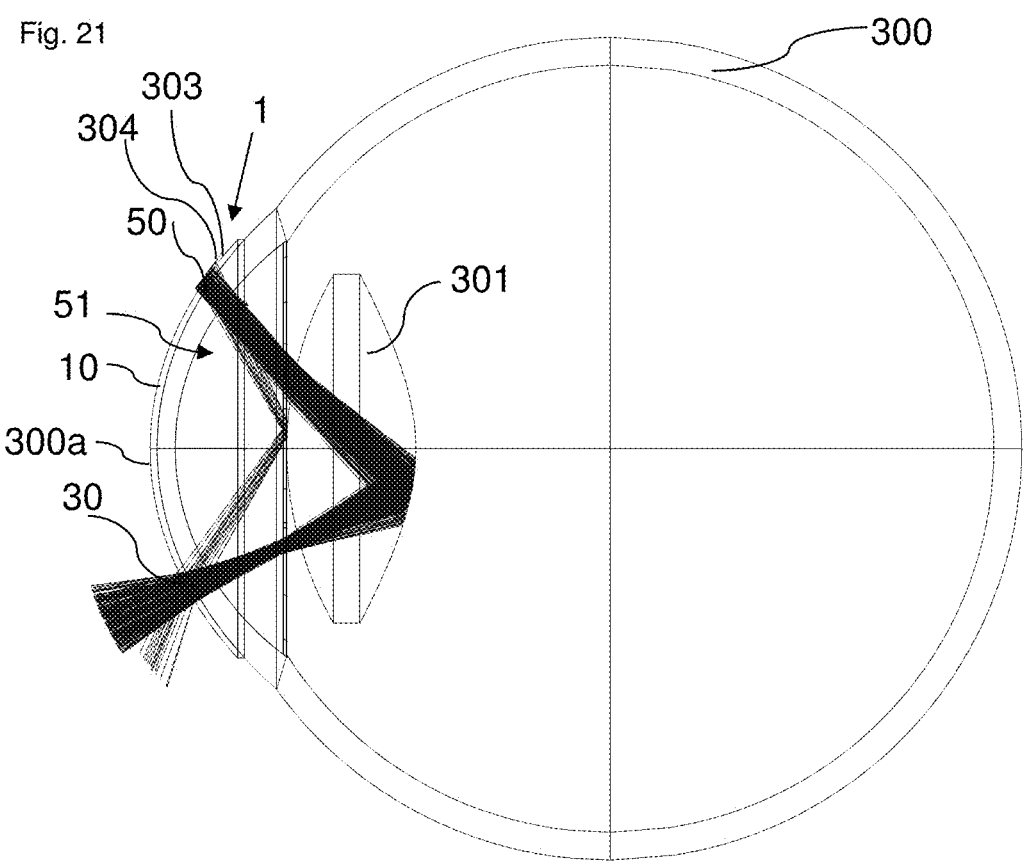
FIG. 21 Shows an optical device according to the invention in the form of a contact lens, on which eye said contact lens is arranged, and then impinges onto a photosensitive element which provides an output signal e.g. for controlling the focal length of the contact lens.

Finally, FIG. 21 corresponds to an accommodation of the eye 300 of 0 D wherein now the contact lens has been shifted radially on the surface 300a of the eye 300 by an amount of 0.5 mm, which can be achieved by the user by focusing an object nearby. The contact lens can for example be designed such that the lens moves when the users looks down or towards the nose. Here, the output signal corresponds to a light intensity of 0.39% of the source intensity.

Thus, the output signal from the photosensitive element 30 can be advantageously used to control the contact lens 1, particularly the focal length of the contact lens 1.

Figure 22:
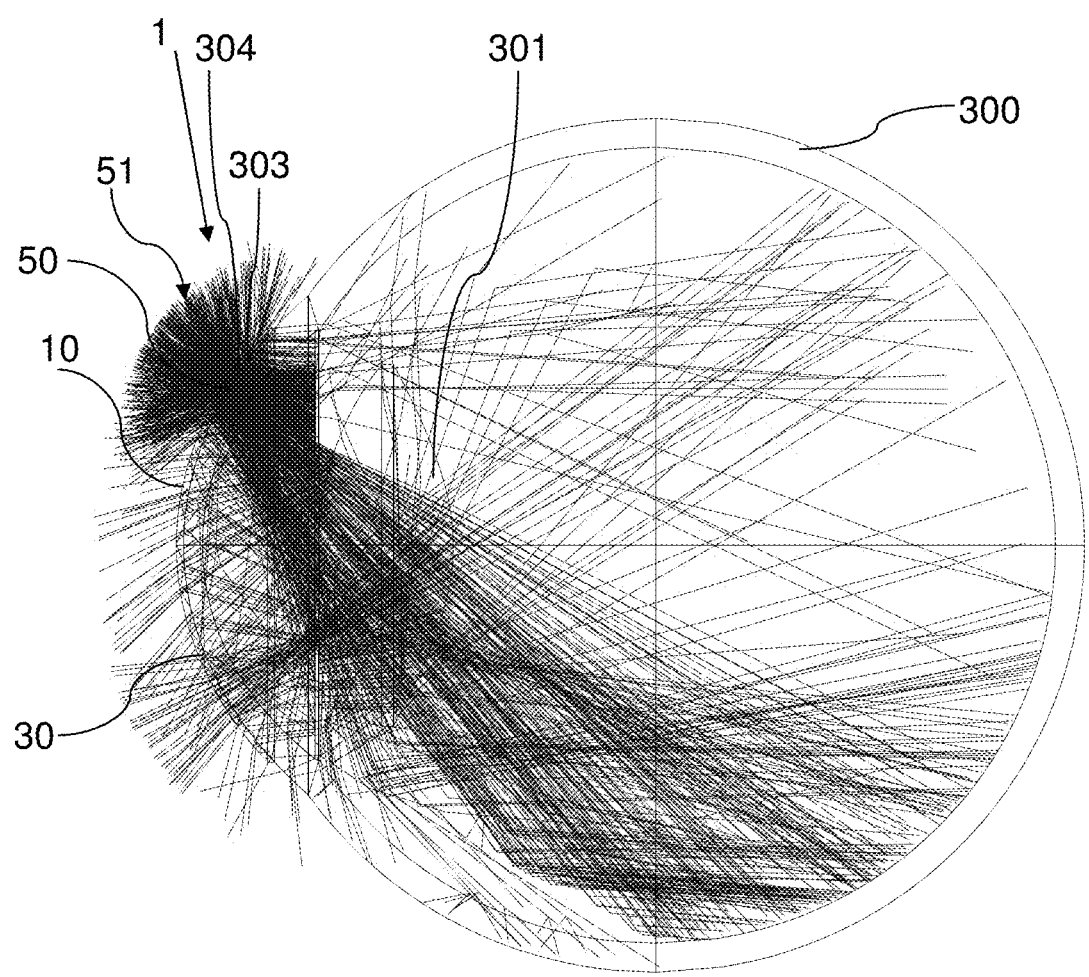
FIG. 22 Shows an optical device according to the invention in the form of a contact lens, on which eye said contact lens is arranged, and then impinges onto a photosensitive element which provides an output signal e.g. for controlling the focal length of the contact lens.

As a comparison, FIG. 22 shows all light rays extending from the source 50.

Figure 23:
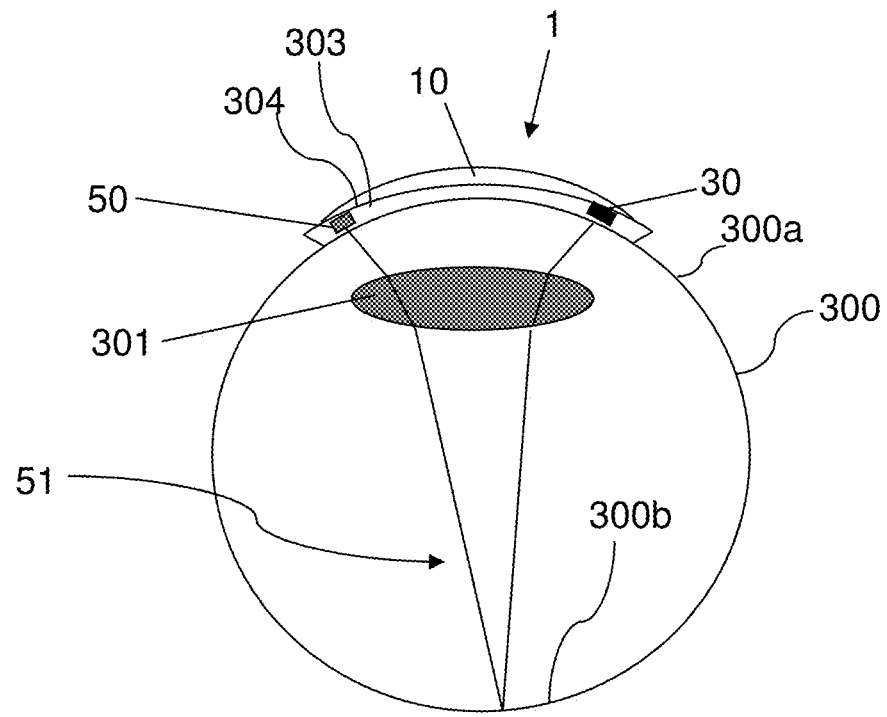
FIG. 23 Shows an optical device according to the invention in the form of a contact lens, wherein light emitted by a light source arranged in the contact lens is reflected by the lens of the eye of the user or the retina of the eye of the user, on which eye said contact lens is arranged, and then impinges onto a photosensitive element which provides an output signal e.g. for controlling the focal length of the contact lens.
Figure 24:
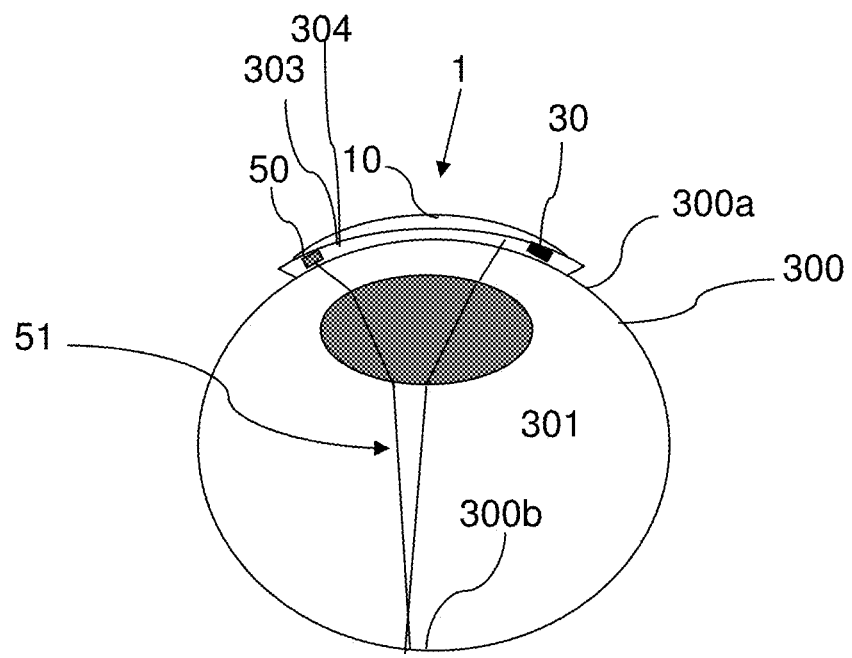
FIG. 24 Shows an optical device according to the invention in the form of a contact lens, wherein light emitted by a light source arranged in the contact lens is reflected by the lens of the eye of the user or the retina of the eye of the user, on which eye said contact lens is arranged, and then impinges onto a photosensitive element which provides an output signal e.g. for controlling the focal length of the contact lens.
Figure 25:
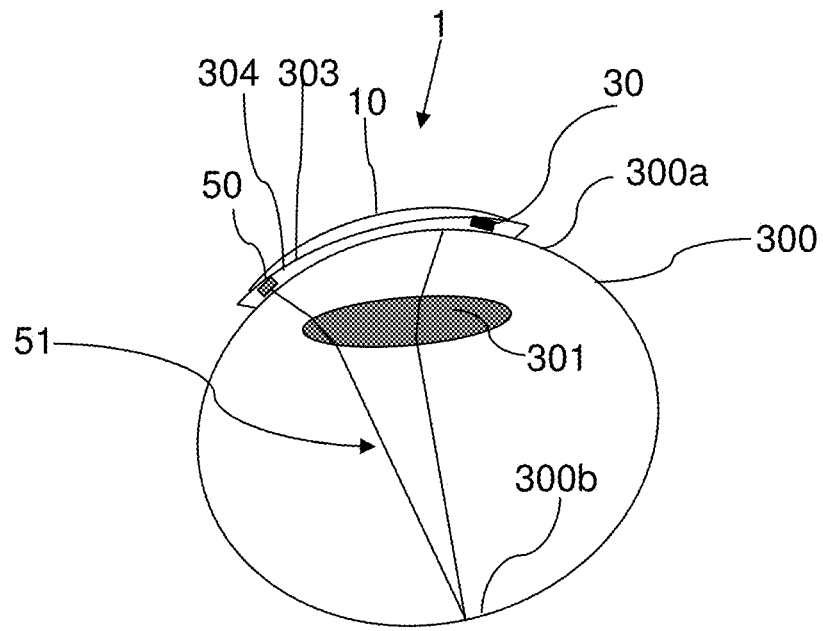
FIG. 25 Shows an optical device according to the invention in the form of a contact lens, wherein light emitted by a light source arranged in the contact lens is reflected by the lens of the eye of the user or the retina of the eye of the user, on which eye said contact lens is arranged, and then impinges onto a photosensitive element which provides an output signal e.g. for controlling the focal length of the contact lens.

FIGS. 23 to 25 also show the optical device 1 in the form of a contact lens that is arranged on a surface 300a of an eye 300 of the user (e.g. a person wearing the contact lens 1), wherein this time, the light source 50 and the photosensitive element 30 are configured such that the light 51 emitted by the light source 50 passes the lens 301 of the eye 300 on which the contact lens 1 is placed is particularly deflected by said lens 301 and is then reflected on the retina 300b of said eye and travels back via the lens 301 (where the light 51 is particularly deflected again) to the photosensitive element 30.

Here, FIG. 23 shows the situation where emitted light 51 reflected on the retina 300b hits the photosensitive element 30, while in FIG. 24 less emitted light 51 impinges on the photosensitive element 30 due to the fact that the lens 301 is deformed (e.g. by focusing it) by the user of the contact lens 1. Further, less light 51 on the photosensitive element can also be achieved by displacing the position of the contact lens on the surface 300a of the eye 300 which is shown in FIG. 25. Such a movement can be achieved by the user as described above. Thus, also in case the emitted light is guided via the retina 300b, the output signal of the photosensitive element 30 can be used to control the contact lens 1 as described above.

Figure 26:
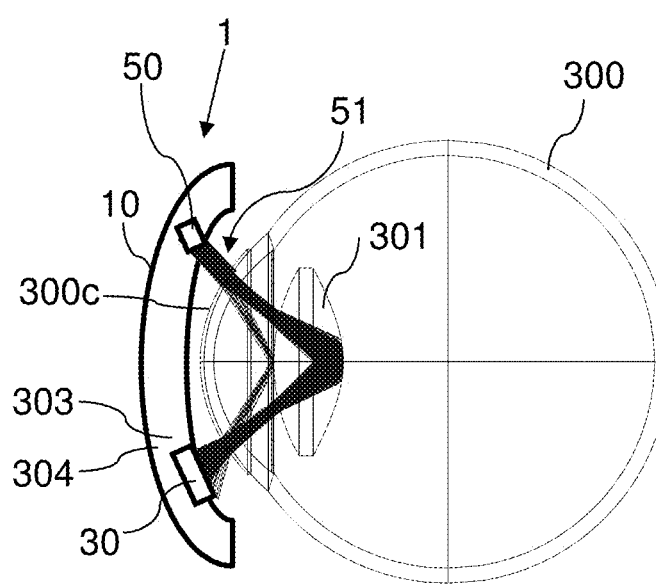
FIG. 26 Shows an optical device according to the invention that is designed to be worn in front of an eye of a user (e.g. glasses), wherein light emitted by a light source arranged in the optical device is reflected by the lens of the eye of the user or the retina of the eye of the user, and then impinges onto a photosensitive element which provides an output signal e.g. for controlling the focal length of the optical device.
Figure 27:
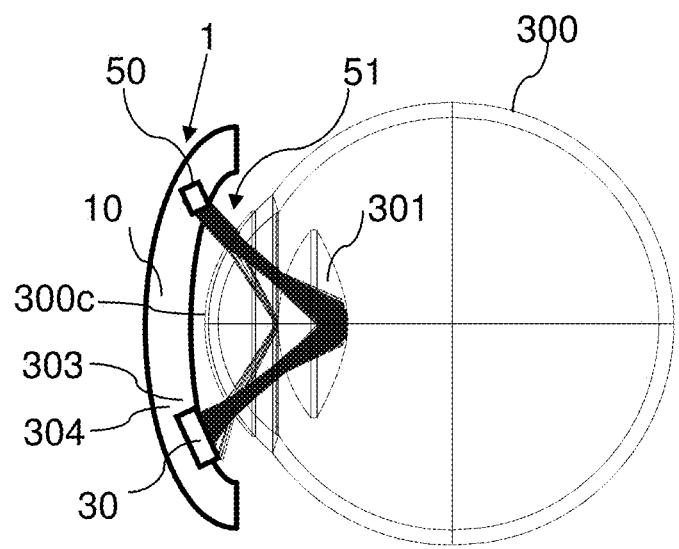
FIG. 27 Shows an optical device according to the invention that is designed to be worn in front of an eye of a user (e.g. glasses), wherein light emitted by a light source arranged in the optical device is reflected by the lens of the eye of the user or the retina of the eye of the user, and then impinges onto a photosensitive element which provides an output signal e.g. for controlling the focal length of the optical device.
Figure 28:
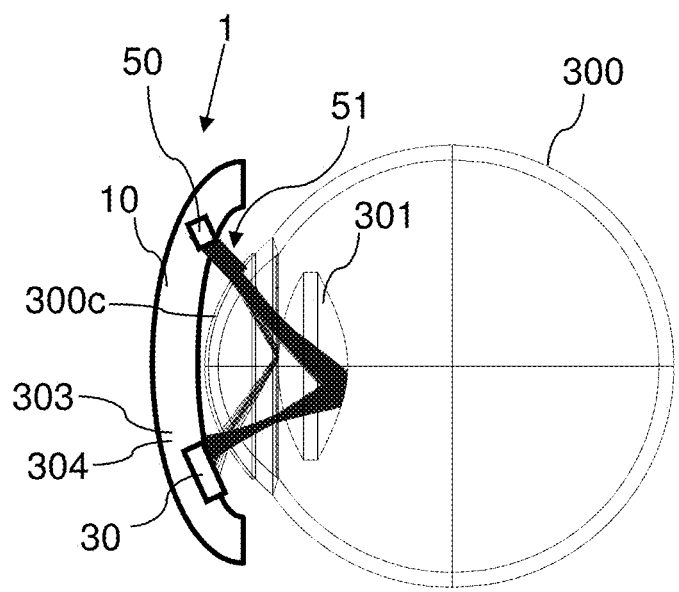
FIG. 28 Shows an optical device according to the invention that is designed to be worn in front of an eye of a user (e.g. glasses), wherein light emitted by a light source arranged in the optical device is reflected by the lens of the eye of the user or the retina of the eye of the user, and then impinges onto a photosensitive element which provides an output signal e.g. for controlling the focal length of the optical device.

Further, FIGS. 26 to 28 show cross sectional views of an aspect and embodiment of the present invention, wherein here, the optical device 1 is designed to worn in front of an eye 300 of a user, e.g. forms glasses 1, that are e.g. configured to be placed on a nose of a user. The optical device 1 comprises at least a lens 10 that is configured to be modified so as to adjust the focal length of the optical device 1 (e.g. glasses).

Further, the optical device 1 comprises a light source 50 for emitting light 51 (particularly IR light so that the eye is not disturbed) and a photosensitive element 30, which may be a photo diode, for detecting emitted light 51 from source 50 and for providing an output signal depending on the intensity of the emitted light 51 that impinges onto the photosensitive element 30.

According to the invention, said light source 50 and said photosensitive element 30 are arranged such on the frame of the optical device 1 or glasses 1 or on the glasses 1 that light emitted 51 by the light source 50 is reflected by the eye 300 and in particular the lens 301 of the eye 300, the cornea 300c or the retina 300b of the user before impinging onto said photosensitive element 30, when the optical device 1 (e.g. glasses) is properly worn by the user.

Preferably, the light source 50 and the photosensitive element 30 are further configured such that the intensity distribution of the emitted light 51 that impinges on the photosensitive element 30 changes when the form of the lens 301 of said eye 300 of the user is changed and/or when the position of the eye 300 of the user changes with respect to the optical device 1 (i.e. due to a looking downwards or inwards), so that said output signal changes as well.

Such arrangement of the source 50 and element 30 can e.g. be found by simulating the emitted light as shown in FIGS. 26 to 28.

Further, the optical device (e.g. glasses) 1 preferably comprises a mechanism 303 for adjusting the focal length of the lens 10, and a control unit 304 for controlling said mechanism 303, wherein the control unit 304 is configured to control said mechanism 303 using said output signal.

In detail, FIG. 26 shows the situation of an accommodation of the eye 300 to 0 D (diopter).

Further, in FIG. 27, the accommodation of the eye 300 is 2D.

Finally, FIG. 28 corresponds to an accommodation of the eye 300 of 0 D wherein now the eye ball has rotated with respect to the optical device 1 or the respective eye glass.

Thus, the output signal from the photosensitive element 30 can be advantageously used to control the optical device or glasses 1, particularly the focal length of the optical device or glasses 1.

We claim:

1. Glasses for vision correction, wherein the glasses (1) are configured to be worn in front of an eye (300) of a user, wherein the glasses comprise:
   a lens (10) comprising a deformable membrane and a fluid, wherein the lens is configured to be arranged in front of said eye (300) of the user and comprises an actuator to be controlled so as to adjust the focal length (f) of the lens (10), wherein the actuator comprises a coil interacting with a magnet, and wherein the glasses (1) further comprise a light source (50) for emitting light (51) and a photosensitive element (30) for detecting emitted light (51) and for providing an output signal depending on the intensity of the emitted light (51) that impinges onto the photosensitive element (30), wherein said light source (50) and said photosensitive element (30) are configured such that light emitted (51) by the light source (50) is reflected by the lens (301) of said eye (300) of the user or by the retina (300*b*) of said eye (300) of the user or by the cornea (300*c*) of said eye (300) of the user before impinging onto said photosensitive element (30).

2. Glasses according to claim 1, characterized in that the light source (50) and the photosensitive element (30) are further configured such that the intensity of the emitted light (51) that impinges on the photosensitive element (30) changes when the form of the lens (301) of said eye (300) of the user is changed and/or when the position of the eye (300) of the user changes with respect to the optical device (1), so that said output signal changes as well.

3. Glasses according to claim 2, characterized in that the glasses (1) comprise a mechanism (303) to adjust the focal length of the lens (10) and a control unit (304) for controlling said mechanism (303), wherein the control unit (304) is configured to control said mechanism (303) using said output signal.

4. Glasses for vision correction, wherein the glasses (1) are configured to be worn in front of an eye (300) of a user, wherein the glasses comprise:
   a lens (10) comprising a deformable membrane and a fluid, wherein the lens is configured to be arranged in front of said eye (300) of the user and to be controlled so as to adjust the focal length (f) of the lens (10),
   wherein the glasses (1) further comprise a light source (50) for emitting light (51) and a photosensitive element (30) for detecting emitted light (51) and for providing an output signal depending on the intensity of the emitted light (51) that impinges onto the photosensitive element (30), wherein said light source (50) and said photosensitive element (30) are configured such that light emitted (51) by the light source (50) is reflected by the lens (301) of said eye (300) of the user or by the retina (300*b*) of said eye (300) of the user or by the cornea (300*c*) of said eye (300) of the user before impinging onto said photosensitive element (30), wherein the light source (50) and the photosensitive element (30) are further configured such that the intensity of the emitted light (51) that impinges on the photosensitive element (30) changes when the form of the lens (301) of said eye (300) of the user is changed and/or when the position of the eye (300) of the user changes with respect to the optical device (1), so that said output signal changes as well.

\* \* \* \* \*